US009595127B2

(12) United States Patent
Champion et al.

(10) Patent No.: US 9,595,127 B2
(45) Date of Patent: Mar. 14, 2017

(54) THREE-DIMENSIONAL COLLABORATION

(71) Applicant: zSpace, Inc., Sunnyvale, CA (US)

(72) Inventors: Clifford S. Champion, San Diego, CA (US); Jonathan J. Hosenpud, Mountain View, CA (US); Michael A. Vesely, Santa Cruz, CA (US)

(73) Assignee: zSpace, Inc., Sunnyvale, CA (US)

( * ) Notice: Subject to any disclaimer, the term of this patent is extended or adjusted under 35 U.S.C. 154(b) by 693 days.

(21) Appl. No.: 13/867,245

(22) Filed: Apr. 22, 2013

(65) Prior Publication Data
US 2013/0234934 A1   Sep. 12, 2013

Related U.S. Application Data

(63) Continuation-in-part of application No. 13/333,339, filed on Dec. 21, 2011.

(Continued)

(51) Int. Cl.
*H04N 15/00* (2006.01)
*H04N 13/00* (2006.01)
(Continued)

(52) U.S. Cl.
CPC .............. *G06T 15/00* (2013.01); *G06F 3/012* (2013.01); *G06F 3/0304* (2013.01); *G06F 3/0346* (2013.01); *G06F 3/03545* (2013.01); *G06F 3/04815* (2013.01); *G06K 9/00228* (2013.01); *G06K 9/00281* (2013.01); *G06K 9/3216* (2013.01); *G06K 9/4652* (2013.01); *G06T 7/206* (2013.01); *G06T 7/2033* (2013.01); *G06T 19/006* (2013.01); *H04N 7/14* (2013.01); *H04N 7/157* (2013.01); *H04N 13/0059* (2013.01); *H04N 13/0468* (2013.01); *G06T 2207/20064* (2013.01); *G06T 2207/30201* (2013.01); *G06T 2219/024* (2013.01)

(58) Field of Classification Search
CPC ................................ H04N 7/14; H04N 7/157
USPC ................................................ 348/14.01, 42
See application file for complete search history.

(56) References Cited

U.S. PATENT DOCUMENTS 5,682,506 A * 10/1997 Corby et al. .................. 345/419
6,042,235 A *  3/2000 Machtig et al. ............... 353/28
(Continued)

OTHER PUBLICATIONS

C.G.M. Meskers, H. Fraterman, F.C.T. van der Helm, H.M. Vermeulen, P.M. Rozing, Calibration of the "Flock of Birds" electromagnetic tracking device and its application in shoulder motion studies, Journal of Biomechanics, vol. 32, Issue 6, Jun. 1999, pp. 629-633.*

(Continued)

*Primary Examiner* — Jeremaiah C Hallenbeck-Huber
(74) *Attorney, Agent, or Firm* — Meyertons Hood Kivlin Kowert & Goetzel, P.C.; Jeffrey C. Hood

(57) ABSTRACT

Remote collaboration of a subject and a graphics object in a same view of a 3D scene. In one embodiment, one or more cameras of a collaboration system may be configured to capture images of a subject and track the subject (e.g., head of a user, other physical object). The images may be processed and provided to another collaboration system along with a determined viewpoint of the user. The other collaboration system may be configured to render and project the captured images and a graphics object in the same view of a 3D scene.

20 Claims, 9 Drawing Sheets

Related U.S. Application Data

(60) Provisional application No. 61/426,451, filed on Dec. 22, 2010.

(51) Int. Cl.

| | | |
|---|---|---|
| *G06T 15/00* | (2011.01) | |
| *H04N 7/14* | (2006.01) | |
| *H04N 7/15* | (2006.01) | |
| *G06T 19/00* | (2011.01) | |
| *H04N 13/04* | (2006.01) | |
| *G06F 3/01* | (2006.01) | |
| *G06F 3/03* | (2006.01) | |
| *G06F 3/0481* | (2013.01) | |
| *G06F 3/0346* | (2013.01) | |
| *G06F 3/0354* | (2013.01) | |
| *G06T 7/20* | (2006.01) | |
| *G06K 9/00* | (2006.01) | |
| *G06K 9/32* | (2006.01) | |
| *G06K 9/46* | (2006.01) | |

(56) References Cited

U.S. PATENT DOCUMENTS

| | | | |
|---|---|---|---|
| 7,162,528 | B1 | 1/2007 | Simonoff et al. |
| 2002/0080094 | A1* | 6/2002 | Biocca et al. ............... 345/8 |
| 2003/0067536 | A1* | 4/2003 | Boulanger et al. ........ 348/14.08 |
| 2007/0248261 | A1 | 10/2007 | Zhou et al. |
| 2008/0192990 | A1* | 8/2008 | Kozakaya ................. 382/117 |
| 2009/0304232 | A1* | 12/2009 | Tsukizawa ................ 382/103 |
| 2010/0073454 | A1* | 3/2010 | Lovhaugen et al. ....... 348/14.03 |
| 2010/0100594 | A1 | 4/2010 | Frees et al. |
| 2010/0306670 | A1* | 12/2010 | Quinn ................ G06Q 10/1095 715/753 |
| 2010/0328423 | A1* | 12/2010 | Etter ......................... 348/14.16 |
| 2011/0078592 | A1 | 3/2011 | Dawson et al. |
| 2011/0169826 | A1 | 7/2011 | Elsberg et al. |

OTHER PUBLICATIONS

"Face Detection using OpenCV;" OpenCV, http://opencv.willowgarage.com/wiki/FaceDetection, retrieved online Nov. 29, 2012; pp. 1-12.

"SURF;" Wikipedia, http://en.wikipedia.org/wiki/SURF, retrieved online Nov. 29, 2012; pp. 1-2.

"HSL and HSV;" Wikipedia, http://en.wikipedia.org/wiki/HSL_and_HSV, retrieved online Nov. 29, 2012; pp. 1-28.

Black, James; Ellis, Tim; "Multi Camera Image Measurement and Correspondence;" Journal of the International Measurement Confederation, 35(1) Elsevier, July, ISBN/ISSN 0263-2241 (2002); pp. pp. 61-71.

Guan, Haiying; Venkateswarlu, Ronda; "Adaptive Multi-modal Algorithm on Human Detection and Tracking;" Centre for Signal Processing, Nanyang Technological University, Singapore, http://www.docstoc.com/docs/19484072/Adaptive-Multi-modal-Algorithm-on-Human-Detection-and-Tracking (posted Dec. 15, 2009), retrieved Nov. 29, 2012; pp. 1-9.

Chen, Jason; "Sony Move Review: Don't Be Wii 2.0;" Gizmodo, http://gizmodo.com/5640908/sony-move-review-dont-be-wii-20 (Sep. 17, 2010), retrieved Nov. 29, 2012; pp. 1-5.

Einselen, John; "Stereoscopic Cameras;" Vectorform, http://blog.vectorform.com/2010/09/14/stereoscopic-cameras/ (Sep. 14, 2010), retrieved Nov. 29, 2012; pp. 1-5.

Bay et al.; "Speeded-Up Robust Features (SURF);" Journal of Computer Vision and Image Understanding, vol. 110, Issue 3, Jun. 2008; Elsevier Science Inc., New York, NY; pp. 346-359.

Cline et al.; "Two algorithms for the three-dimensional reconstruction of tomograms;" Medical Physics. vol. 15. No. 3, May/Jun. 1988, 0094-2405/881030320-08$01.20; pp. 320-327.

Lipton, Lenny; "Stereoscopic Composition;" Wordpress, http://lennylipton.wordpress.com/2009/02/15/stereoscopic-composition/ (Feb. 15, 2009), retrieved Nov. 29, 2012; pp. 1-13.

Liu et al.; "Rapid Modeling of Animated Faces From Video;" Technical Report MSR-TR-2000-11, Feb. 28, 2000, Microsoft Research, Redmond, WA, http://research.microsoft.com/apps/pubs/default.aspx?id=69797, retrieved Nov. 29, 2012; pp. 1-22.

Sucontphunt et al.; "Crafting 3D Faces Using Free Form Portrait Sketching and Plausible Texture Inference;" Graphics Interface (GI) 2010, http://www.tanasai.com/joomla/Files/Publication/gi2010_Janasai.pdf, retrieved Nov. 29, 2012; pp. 1-8.

Xiong, Yingen; Quek, Francis; "Head Tracking with 3D Texture Map Model in Planning Meeting Analysis;" in Proceedings of International Workshop on Multimodal Multiparty Meeting Processing (MMP05), Seventh International Conference on Multimodal Interfaces (ICM105), Oct. 4-6, 2005 (Trento, Italy); pp. 1-8.

Liu, Zicheng; Zhang, Zhengyou; "Robust Head Motion Computation by Taking Advantage of Physical Properties;" Proc. Workshop On Human Motion, Dec. 2000, http://citeseerx.isl.psu.edu/viewdoc/summary?doi=1 0.1.1.21.2280, retrieved Nov. 29, 2012; pp. 73-77.

Yang, Riugang; Zhang, Zhengyou; "Eye Gaze Correction with Stereovision for Video-Teleconferencing;" Microsoft Research, Redmand, WA, http://www.research.microsoft.com, Dec. 2001, Technical Report MSR-TR-2001-119; pp. 1-15.

Regenbrecht et al.; "An Augmented Virtuality Approach to 3D Videoconferencing;" Proceedings of the Second IEEE and ACM International Symposium on Mixed and Augmented Reality (ISMAR '03), Oct. 7-10, 2003; pp. 1-2.

Cherbakov et al.; "Virtual Spaces: Enabling Immersive Collaborative Enterprise, Part 1: Introduction to the opportunities and technologies;" developerWorks, Jun. 30, 2009, retrieved from <http://www.ibm.com/developerworks/webservices/library/ws-virtualspaces/> on Jun. 24, 2013; pp. 1-13.

\* cited by examiner

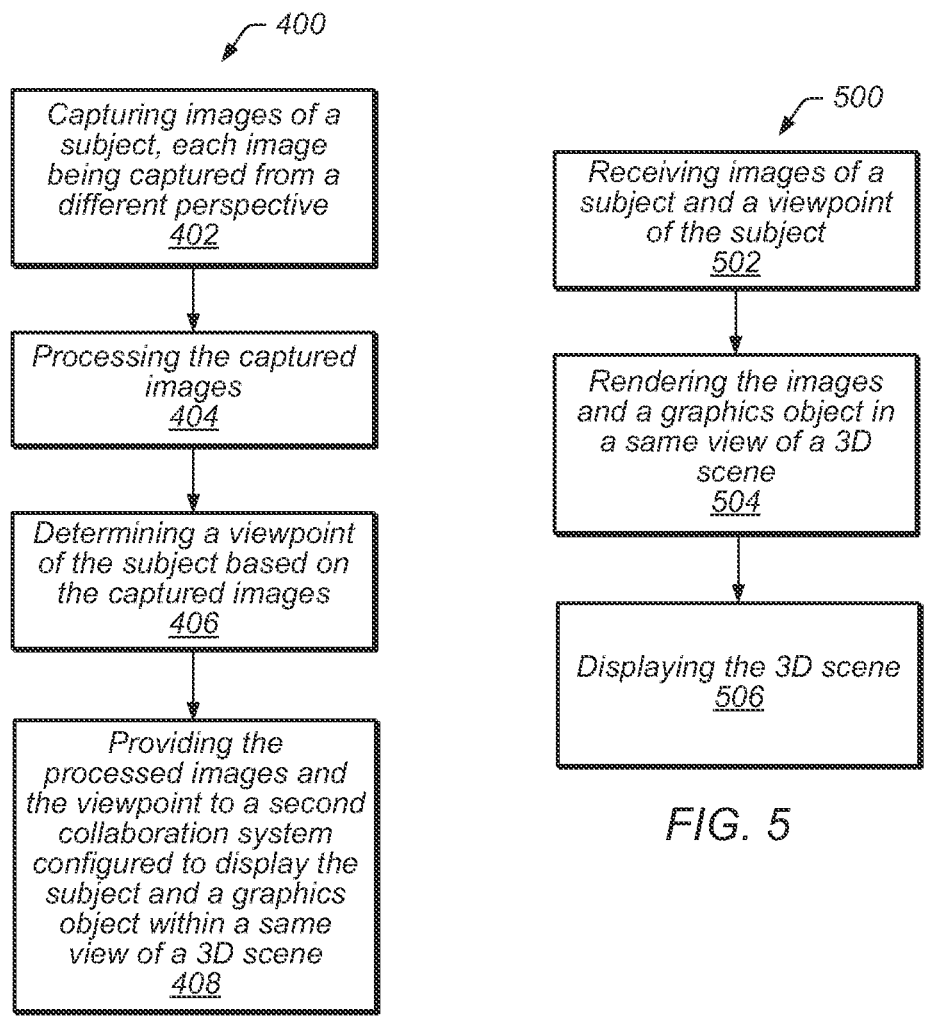

THREE-DIMENSIONAL COLLABORATION

PRIORITY INFORMATION

This application is a continuation-in-part of U.S. patent application Ser. No. 13/333,339 entitled "Three-Dimensional Collaboration" by Michael A. Vesely, Jerry Tu, and Peter F. Ullmann, filed Dec. 21, 2011, which claims benefit of priority of U.S. Provisional Application Ser. No. 61/426,451 entitled "Three-Dimensional Collaboration" by Michael A. Vesely, Jerry Tu, and Peter F. Ullmann, filed Dec. 22, 2010, the contents of which are incorporated by reference herein in its entirety as though fully and completely set forth herein.

INCORPORATION BY REFERENCE

The following references are hereby incorporated by reference in their entirety as though fully and completely set forth herein:

U.S. patent application Ser. No. 11/098,681 (U.S. Patent Publication No. 2005/0219694), titled "Horizontal Perspective Display", filed on Apr. 4, 2005.

U.S. patent application Ser. No. 11/141,649 (U.S. Patent Publication No. 2005/0264858), titled "Multi-plane Horizontal Perspective Display", filed on May 31, 2005.

U.S. patent application Ser. No. 12/797,958, titled "Presenting a View within a Three Dimensional Scene", filed on Jun. 10, 2010.

U.S. Provisional Application Ser. No. 61/426,448 entitled "Three-Dimensional Tracking of Objects in a 3-D Scene" by David Chavez, Milind Paranjpe, Jerry Tu, and Michael Cheponis, filed Dec. 22, 2010.

U.S. patent application Ser. No. 13/333,299 entitled "Three-Dimensional Tracking of a User Control Device in a Volume" by David A. Chavez, Milind Paranjpe, Jerome C. Tu, filed on Dec. 21, 2011, which claims priority to the above incorporated by reference U.S. Provisional Application Ser. No. 61/426,448.

TECHNICAL FIELD

This disclosure relates to the field of collaboration, and more particularly three-dimensional collaboration.

DESCRIPTION OF THE RELATED ART

Networked computer sessions allow users to collaborate with remote users. However, current 3D collaboration systems are limited in their capabilities. For example, current systems have a perceptual disconnect between the collaborators and what is being collaborated.

SUMMARY OF EMBODIMENTS

Embodiments of the disclosure relate to presenting a three-dimensional (3D) collaboration integrating a graphics object and a subject into the same view of a 3D scene. The displayed 3D scene at each collaboration station may include digital object content as well as images of other collaborating users. In one embodiment, one or more tracking sensors may be configured to capture images of a subject. The tracking sensors may also be used to track an object, such as a user control device (e.g., stylus, glove, etc.). A processing subsystem may be configured to receive and process the captured images. The processing subsystem may be further configured to determine a viewpoint of a user. In some embodiments, the processing subsystem may also be configured to provide the processed captured images and viewpoint of the user to another 3D collaboration station that is configured to use the processed captured images and viewpoint to display the subject and a graphics object in the same view of a 3D scene.

A 3D collaboration system may include a processing subsystem configured to receive processed captured images of a subject and a viewpoint of a user from another 3D collaboration system. The processing subsystem may be further configured to render the processed captured images and a graphics object in a same view of a 3D scene. The 3D collaboration system may include a display that is configured to display the 3D scene.

BRIEF DESCRIPTION OF THE DRAWINGS

A better understanding of the present disclosure can be obtained when the following detailed description of the preferred embodiment is considered in conjunction with the following drawings, in which:

FIG. 4 is a flowchart illustrating one embodiment of a method for performing a 3D collaboration, according to various embodiments.

FIG. 5 is a flowchart illustrating one embodiment of a method for presenting a 3D collaboration, according to various embodiments.

Figure 1:
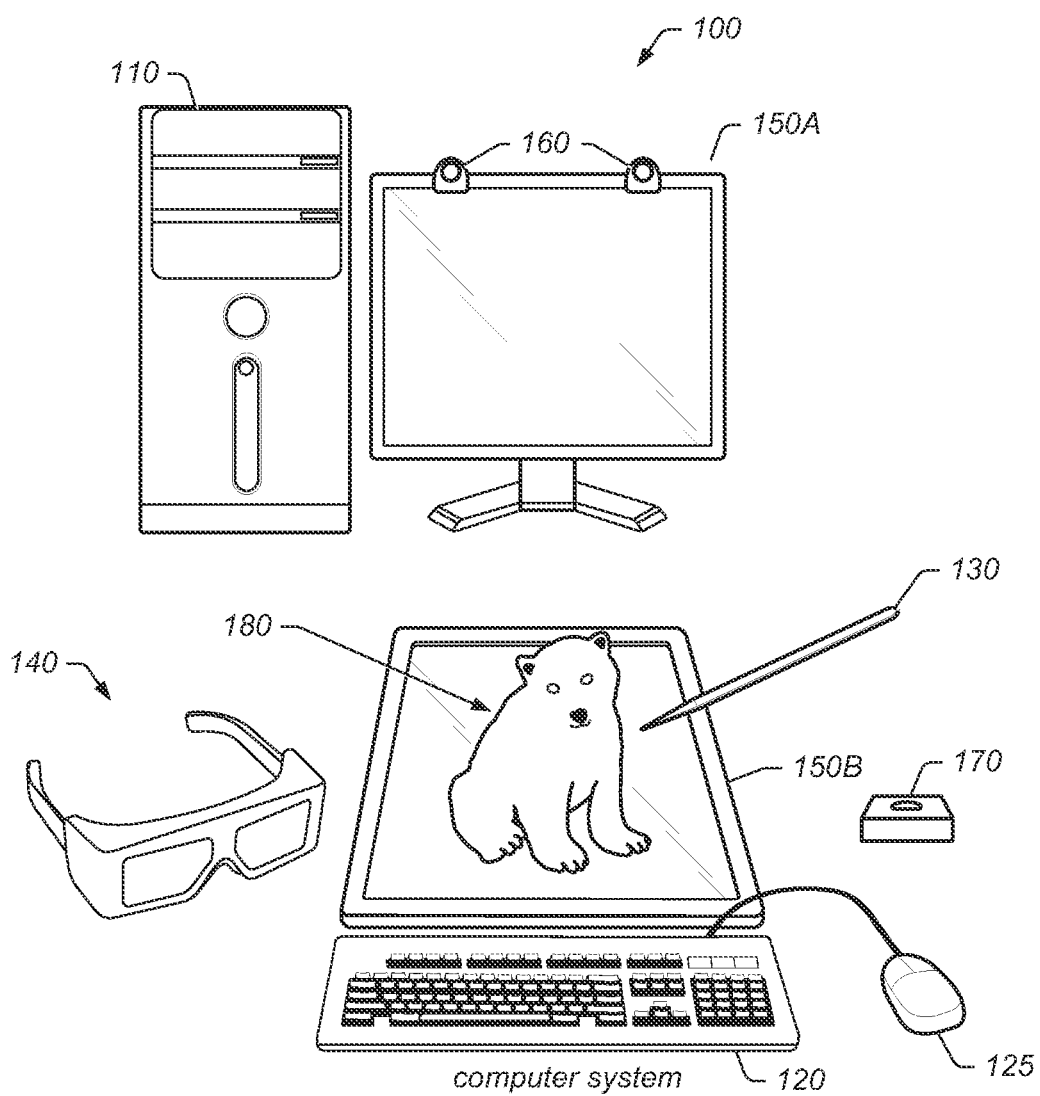
FIGS. 1 and 2 illustrate exemplary systems configured to implement various embodiments.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Terms

The following is a glossary of terms used in the present application:

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Memory Medium—any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, or other device or combinations of devices. In general, the term "computer system" can be broadly defined to encompass any device (or combination of devices) having at least one processor that executes instructions from a memory medium.

Viewpoint (or Perspective)—this term has the full extent of its ordinary meaning in the field of computer graphics/cameras. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below). The term "virtual viewpoint" refers to a viewpoint from within a virtual representation or 3D scene.

Eyepoint—the physical viewpoint of a single eye or a pair of eyes. A viewpoint above may correspond to the eyepoint of a person. For example, a person's eyepoint has a corresponding viewpoint.

Vertical Perspective—a perspective which is rendered for a viewpoint which is substantially perpendicular to the display surface. "Substantially perpendicular" may refer to 90 degrees or variations thereof, such as 89 and 91 degrees, 85-95 degrees, or any variation which does not cause noticeable distortion of the rendered scene. A vertical perspective may be a central perspective, e.g., having a single (and central) vanishing point. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Horizontal Perspective—a perspective which is rendered from a viewpoint which is not perpendicular to the display surface. More particularly, the term "horizontal perspective" refers to a perspective which is rendered using a substantially 45 degree angled render plane in reference to the corresponding viewpoint. The rendering may be intended for a display which may be positioned horizontally (e.g., parallel to a table surface or floor) in reference to a standing viewpoint perspective. "Substantially 45 degrees" may refer to 45 degrees or variations thereof, such as 44 and 46 degrees, 40-50 degrees, or any variation which may cause minimal distortion of the rendered scene. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the horizontal perspective, but with differing single viewpoints.

Comprising—this term is open-ended. As used in the appended claims, this term does not foreclose additional structure or steps. Consider a claim that recites: "A system comprising a display . . . ." Such a claim does not foreclose the apparatus from including additional components (e.g., a voltage source, a light source, etc.).

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

First, Second, etc.—these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 2:
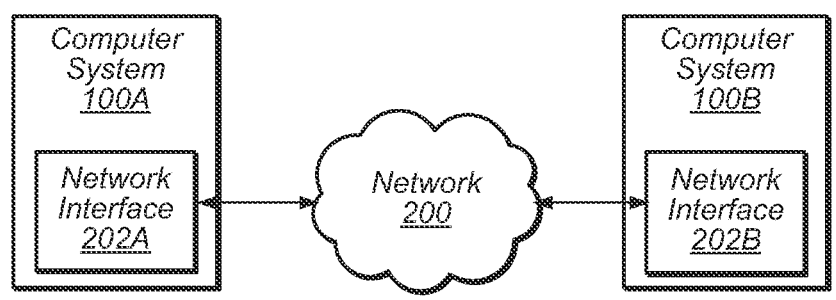

FIGS. 1 and 2—Exemplary Systems

FIGS. 1 and 2 illustrate exemplary systems that are configured to perform various embodiments described below.

In the embodiment of FIG. 1, computer system 100 may include chassis 110, display 150A and display 150B (which may collectively be referred to as display 150 or "at least one display" 150), keyboard 120, mouse 125, stylus 130, eyewear (e.g., glasses) 140, one or more cameras 160, and stylus caddy 170. In one embodiment, at least one of the displays 150A and 150B is a stereoscopic display. For example, in one embodiment, both of the displays 150A and 150B are stereoscopic displays.

The chassis 110 may include various computer components such as processors, memory mediums (e.g., RAM, ROM, hard drives, etc.), graphics circuitry, audio circuitry, and other circuitry for performing computer tasks, such as those described herein. The at least one memory medium may store one or more computer programs or software components according to various embodiments of the present disclosure. For example, the memory medium may store one or more graphics engines which are executable to perform the methods described herein. The memory medium may also store data (e.g., a computer model) representing a virtual/graphic space, which may be used for projecting a 3D scene of the virtual space via the display(s) 150. Further, the memory medium may store software which is executable to perform 3D spatial tracking of stylus 130 or of a user and to render a representation of the user, stylus 130, and graphics object 180 (e.g., digital object content) all in the same single view, as described herein. Additionally, the memory medium may store operating system software, as well as other software for operation of the computer system. Various embodiments further include receiving or storing instructions and/or data implemented in accordance with the foregoing description upon a carrier medium. As indicated above, the computer system 100 may be configured to display a three dimensional (3D) scene (e.g., via stereoscopic images) using the display 150A and/or the display 150B.

It should be noted that the embodiment of FIG. 1 is exemplary only, and other numbers of displays are envisioned. For example, the computer system 100 may include only a single display or more than two displays, or the displays may be arranged in different manners than shown. In this particular embodiment, the display 150A is configured as a vertical display (which is perpendicular to a user's line of sight) and the display 150B is configured as a horizontal display (which is parallel or oblique to a user's line of sight). The vertical display 150A may be used (e.g., via instructions sent by a graphics engine executing in the chassis 110) to provide images which are presented according to a vertical (or central) perspective and the display 150B may be used (e.g., via instructions sent by a graphics engine executing in the chassis 110) to provide images which are presented according to a horizontal perspective. Descriptions of horizontal and vertical perspectives are provided herein. Additionally, while the displays 150 are shown as flat panel displays, they may be any type of system which is capable of displaying images, e.g., projection systems.

Note that the tilt angle of the display(s) may be different from vertical and horizontal positions. For example, various degree offsets from vertical are contemplated (e.g., 15, 30, 45, 60, and 75 degrees). In one embodiment, a single display may be used that has a 30 degree tilt angle.

Either or both of the displays 150A and 150B may present (display) stereoscopic images for viewing by the user. By presenting stereoscopic images, the display(s) 150 may present a 3D scene for the user. This 3D scene may be referred to as an illusion since the actual provided images are 2D, but the scene is conveyed in 3D via the user's interpretation of the provided images. In order to properly view the stereoscopic images (one for each eye), the user may wear eyewear 140. Eyewear 140 may be anaglyph glasses, polarized glasses, shuttering glasses, lenticular glasses, etc. Using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens has the corresponding orthogonal polarization for receiving the corresponding image. With shutter glasses, each lens is synchronized to alternations of left and right eye images provided by the display(s) 150. The display may provide both polarizations simultaneously or in an alternating manner (e.g., sequentially), as desired. Thus, the left eye is allowed to only see left eye images during the left eye image display time and the right eye is allowed to only see right eye images during the right eye image display time. With lenticular glasses, images form on cylindrical lens elements or a two dimensional array of lens elements. The stereoscopic image may be provided via optical methods, where left and right eye images are provided only to the corresponding eyes using optical means such as prisms, mirror, lens, and the like. Large convex or concave lenses can also be used to receive two separately projected images to the user.

In one embodiment, the eyewear 140 may be used as a position input device to track the eyepoint of a user viewing a 3D scene presented by the system 100. For example, eyewear 140 may provide information that is usable to determine the position of the eyepoint(s) of the user, e.g., via triangulation. The position input device can include an infrared detection system to detect the position the viewer's head to allow the viewer freedom of head movement or use a light sensitive detection system. Other embodiments of the input device can be the triangulation method of detecting the viewer eyepoint location, such as at least two tracking sensors (e.g., at least two CCD cameras) providing position data suitable for the head tracking objectives of the disclosure. Yet another embodiment may utilize face recognition, feature detection and extraction, and target tracking algorithms based on optical images captured from the sensors. The input device can be manually operated by the viewer, such as a keyboard, mouse, trackball, joystick, or the like, to indicate the correct display of the horizontal perspective display images. However, any method for tracking the position of the user's head or eyepoint is envisioned. Accordingly, the 3D scene may be rendered such that user can view the 3D scene with minimal distortions (e.g., since it is based on the eyepoint of the user). Thus, the 3D scene may be particularly rendered for the eyepoint of the user, using the position input device. In some embodiments, each eyepoint may be determined separately, or a single eyepoint may be determined and an offset may be used to determine the other eyepoint.

The relationship among the position/orientation of the display(s) 150 and the eye(s) position of the user may be used to map a portion of the virtual/graphic space to the physical space of the system 100. In essence, the physical space and components used are to be mapped to the virtual model in order to accurately render a 3D scene of the virtual space. Examples for implementing such a system are described in the incorporated-by-reference U.S. patent application Ser. No. 11/098,681 entitled "Horizontal Perspective Display" (U.S. Patent Publication No. US 2005/0219694), which was incorporated by reference in its entirety above.

One or more of the user input devices (e.g., the keyboard 120, the mouse 125, the stylus 130, etc.) may be used to interact with the presented 3D scene, such as by manipulating objects in the graphic space of the 3D scene. For example, the user control device 130 (shown as a stylus) or simply the user's hands may be used to directly interact with virtual objects of the 3D scene (via the viewed projected objects). However, this direct interaction may only be possible with "open space" portions of the 3D scene. Thus, at least a portion of the 3D scene may be presented in this "open space", which is in front of or otherwise outside of the at least one display. In some embodiments, that portion of the 3D scene may appear as a hologram above the surface of the display 150. For example, when the horizontal display 150B is used, the 3D scene may be seen as hovering above the horizontal display. It should be noted however, that a portion of the 3D scene may also be presented as appearing behind the display surface, which is not in "open space". Thus, "open space" refers to a space which the user is able to freely move and interact with (e.g., where the user is able to place his hands in the space) rather than a space the user cannot freely move and interact with (e.g., where the user is not able to place his hands in the space, such as below the display surface). This "open space" may be referred to as a "hands-on volume" as opposed to an "inner-volume", which may be under the surface of the display(s). Thus, the user can interact with virtual objects in the open space because they are proximate to the user's own physical space. The inner volume is located behind the viewing surface and presented objects appear inside the physically viewing device. Thus, objects of the 3D scene presented within the inner volume do not share the same physical space with the user and the objects therefore cannot be directly, physically manipulated by hands or handheld tools such as stylus 130. That is, they may be manipulated indirectly, e.g., via a computer mouse, a joystick, or virtual representations of hands, handheld tools, or styluses.

In some embodiments, this open space interaction may be achieved by having a 1:1 correspondence between the virtual objects (e.g., in the virtual/graphic space) and projected objects (e.g., in the physical space). Thus, an accurate and tangible physical interaction is provided by allowing a user to touch and manipulate projected objects with his hands or hand held tools, such as the stylus 130. This 1:1 correspondence of the virtual elements and their physical real-world equivalents is described in more detail in U.S. Patent Publication No. 2005/0264858, which was incorporated by reference in its entirety above. This 1:1 correspondence may allow the user to physically and directly access and interact with projected objects of the 3D scene. This 1:1 correspondence may utilize the creation of a common physical reference plane, as well as, the formula for deriving its unique x, y, z spatial coordinates, thereby correlating the physical coordinate environment to the virtual coordinate environment. Additionally, the 1:1 correspondence allows the user's movement of virtual objects or other interaction (e.g., via the stylus 130) to be the same in physical space and in presented space. However, other embodiments are envisioned where there is a ratio between the distance of the user's physical movement and the corresponding movement in the presented 3D scene (e.g., of the presented object or virtual stylus).

As used herein, an object within a stereo 3D context may be something that is visible or exhibits some tangible form in a relatively stable manner. One example of an object could be a representation of an apple. The apple, as a computer model, could exist as data in a most basic state, taking on various qualities of a 3D object as modeled within a graphic space. This apple object could then be rendered graphically from within the computer's graphic space, based on the viewpoint of the user as translated to the graphic space. The object may have shape and visual texture; however, it may not be necessary for the object to have mass to be an object. It can exist as an image in a virtual environment, and may be the result of a stereo rendering that captures two renderings (e.g., left and right viewpoints) from the identified viewpoint within the graphic space. These two renderings of the object (and any scene aspects within the render view of the graphic space) may be conveyed using a stereo display system. In one embodiment, the graphic space apple object may have no real mass and may not be sensed as an object of substance; however, it can be indirectly handled or manipulated. Handling or manipulating can be accomplished through the combination of the stereo rendering providing visual context and a way to manipulate using spatial position recognition with, for example, a handheld manipulating device (e.g., stylus).

Manipulate may be used herein to describe handling, managing, or otherwise using in some process. In the context of a virtual object projected and viewing using a stereo device, the manipulation may be purely virtual. Therefore, in some embodiments, an object may not necessarily be physically touched to manipulate it. A correlation may exist between the physical space, where a physical manipulator (e.g., stylus) is used, and the graphic space where the object to be manipulated is represented. An object may be manipulated indirectly using one or more manipulating devices, such as a glove or stylus. In other embodiments, objects may be manipulated without a physical manipulator, user control device, or gloves. For instance, the system may recognize a hand, apply it to a skeletal model, and use feature extraction to allow for such manipulations. Examples of manipulating an object may include picking it up, rotating it in any direction, moving it forward or backward, deconstructing it, etc. Such actions may be performed indirectly via usage of the hand-help manipulating device. Using the stereo rendering of the graphics object that may be presented for a user to view via a stereo display device, a faux spatial space may be created and may be viewed. A user may position the manipulating device within the spatial space in a position coincident with the view of the stereo rendered object. The position may be tracked and may have a 1:1 correspondence to the graphic space. With the 1:1 correspondence of the manipulating device in the physical spatial space to the graphic space, a spatial correlation may be established. The coincident object within the graphic space may then be manipulated. As such, the actions of the manipulating device in the spatial space may apply to a virtual object in the graphic space. Manipulation may allow the object to be positioned, oriented, altered, or affected as if the object actually was within the spatial space and acted upon by the manipulating device. Manipulating an object may be used herein to mean virtually handling an object that is in a graphically rendered state and that may be viewed using a stereo display. The interpretation of the object may occur in software where logic may control the interaction of data (e.g., object data, stylus tracking data, etc.). The software may then instruct the scene renderer to render left and right eye images of the scene containing object(s) showing the effect the manipulation had on the object(s). Although much of the description describes manipulating an object, more than one object may be manipulated and/or rendered simultaneously.

In some embodiments, system 100 may be configured to capture images from at least two unique perspectives, for example, by one or more tracking sensors 160. Illustrated in FIG. 1 is an embodiment using two cameras 160. Cameras 160 may be used to image a user of system 100 (e.g., to capture stereoscopic images of the user), track a user's movement, or track a user's head or eyes. In one embodiment, cameras 160 may track a position and an orientation of stylus 130. The information regarding the position and/or orientation of the stylus 130 provided by the two or more cameras 160 may be used in conjunction with other additional information of the system (e.g., an accelerometer and/or gyroscope within the stylus itself) to perform more precise three dimensional tracking of the stylus 130. Cameras 160 may be spatially separated from one another and placed in a position to view a volume that encompasses where a user will view stereo imagery. Such a position may be in an embodiment in which cameras 160 are embedded in a housing of one of the displays 150 (e.g., display 150A). For instance, each camera may be positioned relative to a predefined position and orientation of one or more of displays 150 (e.g., as shown in FIG. 1, each camera may be embedded in display 150B at a predefined position and orientation). Cameras 160 may also be far enough apart from each other to provide for a separation of view for a true three-axis triangulation determination. System 100 may also include a caddy 170 to store or hold stylus 130. Caddy 170 may also be used to calibrate the orientation of the stylus to a known roll, pitch, and yaw. In one embodiment, caddy 170 may be in a fixed position relative to cameras 160.

In various embodiments, tracking sensor(s) 160 may sense a subject (e.g., a physical object, user, etc.). For example, a single tracking sensor may include a single sensor with multiple light fiber bundles with one bundle per view image (perspective) such that multiple images of the subject may be captured with each image having a different, or unique, perspective of the subject. As another example, a single sensor may capture multiple different perspectives by capturing the subject at slightly different times. Still in other examples, more than one tracking sensor may be used to capture the multiple different perspectives of the subject.

The 3D scene generator stored and executed in the chassis 110 may be configured to dynamically change the displayed images provided by the display(s) 150. More particularly, the 3D scene generator may update the displayed 3D scene based on changes in the user's eyepoint, manipulations via the user input devices, etc. Such changes may be performed dynamically, at run-time. The 3D scene generator may also keep track of peripheral devices (e.g., the stylus 130 or eyewear 140) to ensure synchronization between the peripheral device and the displayed image. The system can further include a calibration unit to ensure the proper mapping of the peripheral device to the display images and proper mapping between the projected images and the virtual images stored in the memory of the chassis 110.

Thus, the system 100 may present a 3D scene which the user can interact with in real time. The system may comprise real time electronic display(s) 150 that can present or convey perspective images in the open space and a peripheral device 130 that may allow the user to interact with the 3D scene with hand controlled or handheld tools. The system 100 may also allow the displayed image to be magnified, zoomed, rotated, and moved. Or, system 100 may even display a new image.

Further, while the system 100 is shown as including horizontal display 150B since it simulates the user's visual experience with the horizontal ground, any viewing surface could offer similar 3D illusion experience. For example, the 3D scene can appear to be hanging from a ceiling by projecting the horizontal perspective images onto a ceiling surface, or appear to be floating from a wall by projecting horizontal perspective images onto a vertical wall surface. Moreover, any variation in display orientation and perspective (or any other configuration of the system 100) are contemplated.

FIG. 2 is an exemplary collaborative system. The illustrated embodiment includes two computer systems 100A and 100B and a network 200. Each computer system 100 includes a network interface 202 (shown as 202A and 202B).

Each network interface 202 may be configured to allow data to be exchanged between computer systems 100 and other devices attached to a network, such as other computer systems 100, or between nodes of computer system 100. In various embodiments, network interface 202 may support communication via wired or wireless general data networks, such as any suitable type of Ethernet network, telecommunications/telephony networks such as analog voice networks or digital fiber communications networks, storage area networks, or any other suitable type of network and/or protocol.

As described below, users may collaborate using the two computer systems.

More particularly, embodiments described herein may augment the current state of real-time computer-generated 3D computer graphics and tactile computer-human interfaces with real time interaction. More specifically, these new embodiments may enable real-time collaboration allowing computer-generated 3D simulations, between multiple users, that coexist in physical space and time with the users interacting with the projected objects. This unique ability may be useful in many industries including, but not limited to, electronics, computers, biometrics, medical, education, games, movies, science, legal, financial, communication, law enforcement, national security, military, print media, television, advertising, trade show, data visualization, computer-generated reality, animation, CAD/CAE/CAM, productivity software, operating systems, and more.

Figure 3:
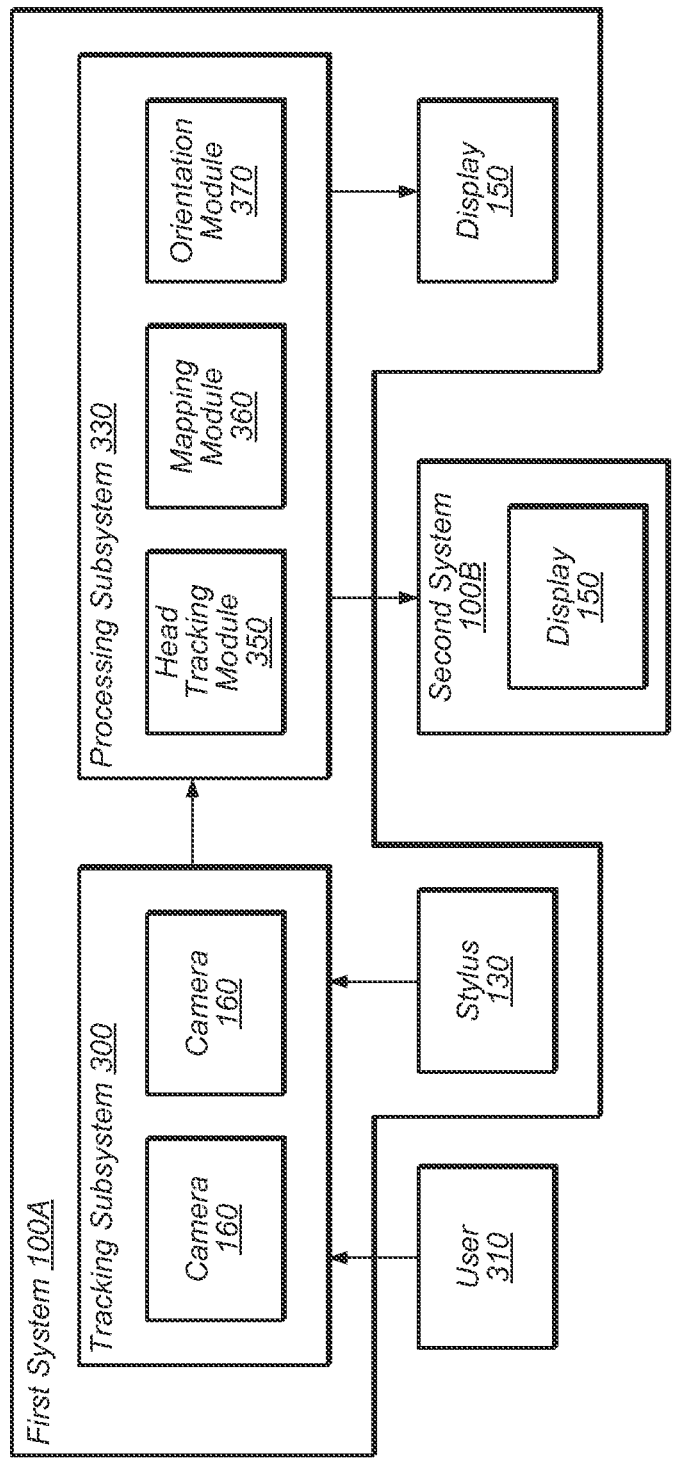
FIG. 3 is a block diagram illustrating one embodiment of the collaboration system.

FIG. 3—Collaborative System

FIG. 3 is a block diagram illustrating one embodiment of the 3D collaboration system. The illustrated collaboration system includes two computer systems 100A and 100B and a user 310. User 310, as the user who is being tracked, may also be referred to as the collaborator. A user of the second computer system 100B may be referred to as the local user. Collaborator and local user are used herein to describe users of one embodiment of the disclosed system. The collaborator may control the collaboration while the local user passively participates, as in a master-slave manner. For instance, the collaborator may choose which digital objects to display and may manipulate those digital objects. In one embodiment, the local user may only view the digital objects, the collaborator, and manipulations of the digital objects but may not actually manipulate or control the digital objects. In other embodiments, the systems may not be in a master-slave configuration and both users may be collaborators. For illustrative purposes, FIG. 3 only shows a single display 150 of the second computer system 100, however, each computer system 100 may contain the same or similar components. As a result, each system may be capable of being either the collaborating system or the local user system. Alternatively, a system may simultaneously be both a collaborating system and a local user system. Each computer system 100 may include user control device 130 (e.g., a stylus, etc.), tracking subsystem 300, processing subsystem 330, and one or more displays 150. Tracking subsystem 300 may include one or more tracking sensors (e.g., 2 cameras) 160 and processing subsystem 330 may include head tracking module 350, mapping module 360, and orientation module 370.

In one embodiment, tracking subsystem 300 may include two cameras 160 that may track a subject (e.g., a physical object like an apple, a book, user 310, etc.) and/or stylus 130. In the illustrated embodiment, two cameras 160 may track any physical object, and/or body part or extension of user 310. For example, cameras 160 may track a position (x, y, z) and orientation (roll, pitch, yaw), six degree of freedom, of user's 310 face, head, torso, body, hands, or any combination thereof, or of a physical object. Tracking subsystem 300 and stylus 130 are detailed in U.S. patent application Ser. No. 13/333,299 entitled "Three-Dimensional Tracking of Objects in a 3-D Scene" by David Chavez, Milind Paranjpe, and Jerry Tu, filed on Dec. 21, 2011, now U.S. Pat. No. 8,970,625, which claims priority to U.S. Provisional Application Ser. No. 61/426,448 entitled "Three-Dimensional Tracking of Objects in a 3-D Scene" by David Chavez, Milind Paranjpe, Jerry Tu, and Michael Cheponis, filed Dec. 22, 2010, each of which is incorporated by reference herein. Cameras 160 may also take images (e.g., videos) of user 310, or other physical objects, which may be used in rendering a portion of the 3D scene, described herein. Tracking subsystem 300 may provide images and information regarding location and orientation of user 310 and any other object, such as stylus 130, to processing subsystem 330. In some embodiments, position and orientation information of display 150 may be provided to processing subsystem 330.

In one embodiment, processing subsystem 330 may include head tracking module 350, mapping module 360, and orientation module 370. Head tracking module 350 may be configured to determine a viewpoint of a user. Head tracking module 350 may identify and track a location and orientation of a head using information from cameras 160 and eyewear 140. Cameras 160 that are configured to perform head tracking may also be configured to perform head model creation and stereo video conferencing. In one embodiment, head tracking module 350, as part of the tracking process, may perform one or more of the following: identify a head as a region of interest; within that region of interest, identify an area that may include eyewear (e.g., a pair of glasses); verify that the area includes eyewear; and obtain the coordinates and orientation based on the verified area.

Head tracking module 350 may identify the head as a region of interest using a recognition process based on detecting features that encode some information about the class of object to be detected. One example of such a process is a Haar classifier technique (although other classifications may be used). Using such a technique, features may encode the existence of oriented contrasts between regions in the image. Haar-like features are used herein to encompass features computed in a similar manner to the coefficients in Haar wavelet transforms. A set of these features may be used to encode the contrasts exhibited by a human face and their spatial relationships. In one embodiment, a Haar classifier may be trained, for example, on areas of a certain size. After a Haar classifier has been trained, the classifier may be applied to a region of interest, the region of interest being the same size used in training, within an input image. The classifier may provide an indication if the region of interest is likely to show the object, e.g., a human face, and another indication otherwise. If the size used by the classifier is smaller than the image, the tracking system can move the classifier across the image to check the entire image. The classifier may also be resized so that it may find various-sized objects of interest. In other embodiments, the image may be resized to fit the classifier. In situations where the object in question is of unknown size, the classifier may scan the image several times, at different scales.

In one embodiment, the classifier may be a "cascade" classifier consisting of several simpler classifiers, or stages, that are applied to a region of interest. The cascade classifier may run until one of the stages rejects a region of interest or until all stages pass. The classifier may use a boosting technique (weighted voting), such as discrete adaboost, real adaboost, gentle adaboost, or logitboost. In one embodiment, the classifiers may be decision-tree classifiers with at least two leaves. Haar-like features may be input to the basic classifiers. The feature used in a particular classifier may be specified by its shape, position within the region of interest, and the scale.

In one embodiment, head tracking module 350 may look for features that could be eyewear (e.g., glasses). In one embodiment, looking for features that could be glasses may be performed according to the Speeded Up Robust Features ("SURF") technique. In other embodiments, it may be performed by other scale-invariant and rotation invariant interest point detection and description techniques. In one embodiment, the technique used may limit the operations to only recognizing glasses, and more specifically, to glasses within the region of interest identified by the classifier.

In one embodiment, head tracking module 350 may validate that the eyewear is actually eyewear and not some image aberration. The validation may be performed by using Hue, Saturation, and Value system (HSV) signatures. The HSV color model uses a hue value of 0 degrees to 360 degrees, with red at 0. Saturation is in the range of 0 to 1, with 0 being no color (along the central axis) and 1 being on the outer edge of the cone. The value, a variation of intensity, also has a range of 0 to 1, where 0 is black and 1 is white. In one embodiment, the HSV image may be maintained as floating-point numbers, or 16-bit or 32-bit integers. The images may be transformed into RGB and reduced to 8-bit integers. For each left and right eye image, a face skin signature may be compared against the image information. The face skin signature may be based on an HSV histogram. Whether skin is present, meaning eyewear is not likely present, may be determined by how image sections converted to HSV sections compare to the HSV histogram. If skin is not present, then it may be likely that eyewear is present in the image. As a result of the validation technique, an outline of eyewear may be identified.

In one embodiment, head tracking module 350 may obtain the x, y, z, roll, pitch, and yaw information of the head based on the identified eyewear. During initial calibration of the display and tracking system, default feature information of the eyewear may be learned, such the location of the corners and nose bridge positions of the eyewear. Information from such features of the eyewear may be collected (e.g., through fiducials or markers) that allow the corners, centers, bridge, etc. to be identified. Changes in the x or y position may be detected when the eyewear moves up, down, left, or right. Changes in the z position may be detected when the eyewear gets smaller or larger. Changes in the roll may be detected when the eyewear rotates. Changes in the pitch may be detected when the eyewear becomes more oval with the top or bottom of the oval getting larger compared to the other side. Changes to the yaw may be detected when the eyewear appears to have reduced its interocular distance, while one side of the eyewear is getting larger (or smaller) than the other side. In one embodiment, where the eyewear was originally calibrated and mapped to the computer graphic space, the eyewear's corresponding physical position and orientation relative to the display may be correlated to the computer graphic space.

In embodiments in which two perspectives from two spatially separated cameras are available, the x, y, and z positions of the eyewear may be estimated via triangulation. The triangulation estimates may then be combined with the previously described estimates, which may result in a more accurate determination of position and orientation.

The head position and orientation tracking data (e.g., viewpoint of the user 310) may then be transferred to the computer graphic system. After the computer graphic system has been aligned to the physical space of the cameras 160, display 100, and user 310, the tracked head may be correlated to a graphic space head model object. In one embodiment, these steps are performed by the mapping module 360. Mapping module 360 may receive two or more distinct video images captured from camera(s) 160. Cameras 160 that perform head model creation may be the same cameras that perform head and stylus tracking Each image may be processed and applied to a 3D model. Models may be provided in a variety of manners. In one embodiment, a default head graphic model may be used, which may include contour descriptors as part of the model. The video image may be processed to determine like facial contours. The system may then map the image facial contours to the graphic model contours. In another embodiment, one of many graphic models may be selected, based on the dimensional offsets of the determined video image facial contours to the head model with the most matches in contour structure. In another embodiment, the images from the two cameras 160 may be stitched into a common image. Various anchor points, or identifiers of facial contours, may be determined. A 3D model may be derived from the images with the images becoming the texture of the model.

Orientation module 370 may allow graphics object (e.g., digital object content) 180, which may include a virtual object and the corresponding projected object in the physical space, to be viewed by a user from the same perspective or object view as seen by user/collaborator 310. Orientation module 370 may also allow digital object content 180 to be viewed by a user from an alternative perspective, such as a back side view as if the user and collaborator are at opposite ends of a table. If the user selects the alternative perspective, the user may employ a gradient transparency to digital object content 180 so as to see where the collaborator is looking or manipulating digital object content 180, for example, with stylus 130. Further, orientation module 370 may, in some embodiments, orient and position digital object content of head objects according to a position or orientation of displays 150.

In one embodiment, the subject (e.g., mapped graphic head model object and/or other mapped physical object) may be displayed on one or more displays 150. Display 150 of FIG. 3 may provide an image of a different user than the collaborator whose head was mapped, or it could be on the collaborator's display. The mapped graphic head model may be displayed concurrently with digital object content 180. In one embodiment, the mapped graphic head model may be rendered onto a user's graphic space in the same proximity of the initial captured video or in a mirrored z position for rendering behind the display within the view volume. In other words, two or more users may have a video conference that allows a graphic head model of a collaborator to coexist with a projected object, making the video conference a transformation to a shared graphic space. In one embodiment, the captured head/torso video of the collaborator may be displayed in the closed space of the user's display 150. It may be positioned on the user's display according to head positioning information tracked by cameras 160.

In one embodiment, the digital object content 180 and the collaborator's head (or torso) and/or other mapped subject may be rendered in the same single view, shared between two or more computer systems 100. Same view is used herein to describe a composite rendering of a rendered scene (e.g., graphics object(s)) from a graphic model and a rendering of an imaged volume (e.g., a rendering of an imaged user of another 3D collaboration system) in a common scene view, hence common coordinate system. Further, a collaborator's virtual stylus 600 operations may be rendered in real time on another user's display. The user may see the collaborator in stereo or mono, independent of where the rendering of the collaborator is rendered on display 150. In one embodiment, the blending of digital object content 180, with a defined position, size, and orientation relative to display 150, is integrated on the user's display with the collaborator's video rendering, with a defined position, size, and orientation relative to display 150, within the same view on the user's display 150. In one embodiment, the user may see any alterations the collaborator makes to the shared digital object content 180, for example, with stylus 130. Additionally, the user may be able to see, on user's display 150, a rendering of the collaborator's virtual stylus 600.

Figure 10:
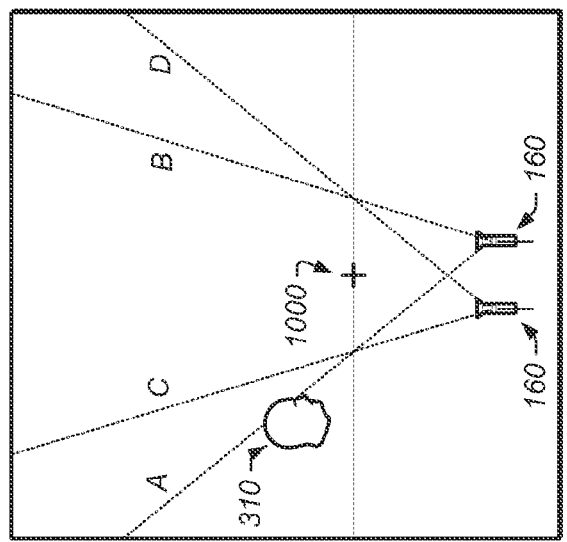
FIGS. 10-12 are exemplary illustrations of one embodiment of cropping camera views.
Figure 11:
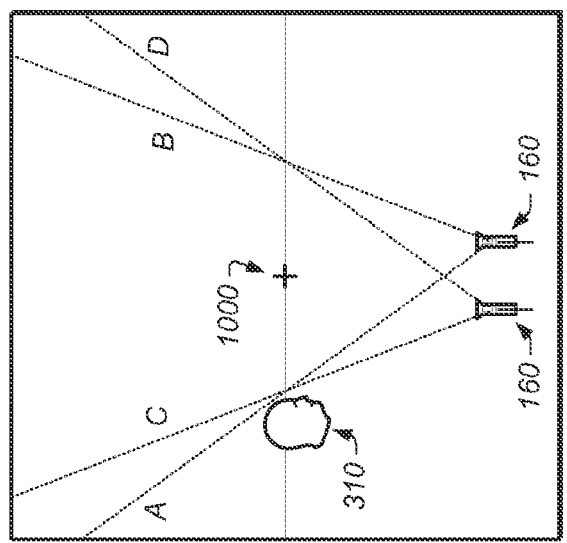
Figure 12:
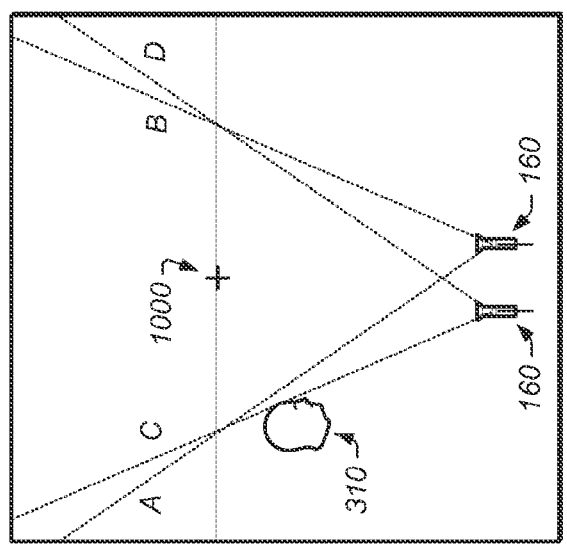

In one embodiment, captured stereo video of the collaborator may be displayed on a user's display 150 in combination with stereo rendered graphics (digital object content 180) in the same view in a manner that allows the collaborator to interact with the volume space of the user. In this embodiment, instead of using a head graphic for collaboration, a flat graphic may be used with the captured video being used as texture. Flat graphic is used herein to describe a graphic object having properties of an x-y plane cutout without a z component in terms of depth. Note that the flat graphic has a z component in terms of placement. The flat graphic may be coincident with a conveyed screen edge that coincides with a zero parallax setting of the captured video. In other words, if the collaborator is sitting two feet behind collaborator's display 150, then the rendition of the collaborator on the local user's display 150 may be two feet behind the conveyed screen edge (e.g., surface of the screen) of the local user's display 150. To facilitate this embodiment, cameras 160 may be set to have zero parallax at the client side (e.g., collaborator system) edge of the screen during image capture. As shown in FIGS. 10-12, the cameras 160 views may then be cropped to correlate with the expected dimension of the viewing device. Further, a lens system may correct distortions introduced by conveying captured video to another display 150 having a one-to-one correspondence. Further, the system may use a magnification that does not contribute to introducing a zoom (+/−) factor to the captured image. On the local user's side, the local user's computer system 100 may have a graphic object that the captured video becomes the texture of Because the video has its defined parallax coincide with the user's display, the graphics engine may create a flat graphic object that is established within the graphic space coinciding with the vertical to be placed at the user's back part of the screen. In this way, the precise positioning of the collaborator's captured video may allow the local user's rendition to have a one-to-one correspondence with the video motion. In various embodiments, the zero parallax may be determined and the zero parallax of the captured video may be matched with the zero plane of the render volume. The zero parallax position may be further determined with image processing.

In various embodiments, the graphic space may be resident within the computing device graphic space of the local user, the computing device graphic space of the collaborator, or a shared computing device graphic space (e.g., a shared server). The graphic space may be defined by the collaborator yet reside in any of the three resident spaces. The user's system may render the graphic space (objects) that is resident in any of the three spaces. Certain objects may be generated by and reside within the graphic space. Those objects may be sharable while others may be inaccessible for specific users. For example, in one embodiment, digital object content may be sharable for one or more local users and may be manipulated by the collaborator, where the objects being manipulated are renderable and hence able to be seen by the local user(s). Head objects, as opposed to other digital object content, may not be part of the collaboration graphic space and therefore may be accessible by specific users. For example, the local user may see the collaborator's head object, but not his own head object. Likewise, the collaborator may see the local user's head object, but not his own. In one embodiment, head objects may reside in the shared space. In one embodiment, head objects may reside in either the collaborator space or user space, but with special attributes such that the object may be rendered such that the appropriate recipient may see the correct head object. In other words, various head objects may coexist in a common space on a common server, but may be rendered by the appropriate recipient's render engine. In one embodiment, head objects may reside outside the common graphic space, but with appropriate spatial coordinates, so that the appropriate head object may be integrated into the intended recipient's scene.

FIG. 4—Performing a 3D Collaboration Between Computer Systems

FIG. 4 illustrates a method 400 for capturing and processing data for a 3D collaboration. Such data may be used in a collaboration between computer systems (3D collaboration systems). The method shown in FIG. 4 may be used in conjunction with any of the computer systems or devices shown in the above figures, among other devices. In various embodiments, some of the method elements shown may be performed concurrently, in a different order than shown, or may be omitted. In some embodiments, method 400 may include additional (or fewer) steps than shown. As shown, method 400 may operate as follows.

At 402, one or more tracking sensors (e.g., cameras 160) of a first 3D collaboration system, such as computer system 100, may capture images of a subject (e.g., physical object, user/collaborator, head, torso, etc.). Each image may be captured from a different perspective. In an embodiment with two cameras 160, each camera 160 may capture a respective image of the subject. Cameras 160 may be the same cameras used to track objects such as user control device 130 or the head or torso of the user. Thus, in addition to the actual images, cameras 160 may also provide information regarding position and orientation of the user and stylus 130 to the first 3D collaboration system. As described above, cameras 160 may be physically separated by at least a normal interocular distance, and may be embedded in a housing of a display 150 of the first 3D collaboration system. Cameras 160 may also be set to have zero parallax at the client side (e.g., first 3D collaboration system) edge of the screen/display during capture. The screen/display edge is used herein to mean the surface of the display. Cameras 160 may further include a lens system to correct for distortions associated with conveying captured video to a rendered display having a one-to-one correspondence. There may also be more than one display-aligned camera 160 spaced at different locations that may be attached to the display system or positioned in conjunction with the display system.

In various embodiments, block 402 may be repeated such that the cameras capture additional images (e.g., a plurality of images). Such capturing of images and additional images may be continuous (e.g., at a sufficient frame rate of 60 frames per second (fps) or more for approximating a real-time response). For instance, the cameras may capture images in the form of a 60 fps video that includes a number of images.

As illustrated at 404, the first 3D collaboration system may process the captured digital images. In one embodiment, processing the images may include applying the images to a 3D model. Processing can be done in a variety of ways, using varying amounts of processing power. Some examples of techniques for processing the images are described above. After processing, the images may become the texture of the model derived from the images.

In one embodiment, processing the images may include cropping the images (e.g., a first image from one of the cameras and a second image from the other camera), which could be left and right camera views to correlate with an expected dimension of a viewing device. Processing may also include correcting for distortions associated with conveying captured video to a display having a one-to-one correspondence. Processing may further include using a magnification that enables not introducing a zoom (+/−) factor to the captured image. Such an embodiment may allow the rendition of the collaborator in the local user's display 150 to be precisely positioned an appropriate distance in the positive/closed space of display 150 from the zero parallax point, (e.g., the edge of display 150A).

Spatial coordinates and orientation of the subject may be tracked based on the captured images and/or the additional captured images. In some embodiments, the tracked spatial coordinates and orientation of the subject may be correlated to a graphic space. As described herein, the graphic space may be shared. The graphic space may be implemented in the first 3D collaboration system, the second 3D collaboration system, or a combination thereof.

As shown at 406, the first 3D collaboration system may determine a viewpoint of the user. The viewpoint may include an x, y, z position and a roll, pitch, yaw orientation of the user. The determined viewpoint may be used to convey the user's viewpoint of a digital object content 180, or projected object, to another user so that the other user can see what the original user was looking at. In one embodiment, determining the viewpoint of the user may include identifying a head as a region of interest, as described herein. Determining the viewpoint may also include within the identified region of interest, identifying an area that potentially includes eyewear. Determining the viewpoint may further include verifying that the area includes the eyewear and obtaining coordinates and an orientation of the head based on the verified area.

At 408, the first 3D collaboration system may provide the processed captured images and viewpoint to a second 3D collaboration system. In some embodiments, the first 3D collaboration system may also provide stylus location and orientation and digital object content 180 (e.g., graphics object) to a second 3D collaboration system. The second 3D collaboration system may be configured to use the processed captured images and the viewpoint to display the subject and/or the graphics object within the same view of a stereo 3D scene. Part of the same view may mean that the displayed subject and graphics object may be rendered as part of a common coordinate system of the 3D graphic space. Providing the processed image, stylus information, digital object content 180, and viewpoint to another user may be done in any manner. For example, the users may be remotely located and the computer systems 100 may communicate over a network, as shown in FIG. 2. In some embodiments, each of the 3D collaboration systems may be compatible in scale.

In various embodiments, blocks 402-408 may repeat to allow for a realistic interactive video conferencing system between two 3D collaboration systems. For example, the tracking sensor(s) may track the subject by capturing additional images (e.g., a plurality of images) of the subject over a period of time. The period of time may be small enough to achieve at frame rate of at least 60 frames per second. In some embodiments, processing the captured images may result in a stereo head model. The processing subsystem may track spatial coordinates and the orientation of the stereo head model based on the plurality of images and may also correlate the tracked spatial coordinates and orientation of the head model to the 3D graphic space.

Each 3D collaboration system in a collaborative environment may operate as a collaborating (e.g., first 3D collaboration system in the method of FIG. 4) or as a local system (e.g., second 3D collaboration system in the method of FIG. 4). In one embodiment, computer systems 100 may operate in a master-slave manner. The blocks of method 400 may be performed by the first 3D collaboration system in one instance and by the second 3D collaboration in another instance, with the two computer systems 100 reversing their roles. Alternatively, each computer system 100 may be a collaborator at the same time and each computer system 100 may simultaneously perform methods 400 and 500 (described below). For example, one 3D collaboration system may perform method 400 and also receive captured images of another subject (e.g., another physical object, another user, etc.) from the other 3D collaboration system. With the received images of the other subject, the one 3D collaboration system may render the other subject and provide a rendering of the other subject to a display of the one 3D collaboration system such that the rendered other subject and the stereo rendered graphics object are in the same view of the stereo 3D scene. Moreover, each user may see each other user and each user may be able to interact with one or more projected objects in the same shared workspace. The shared workspace may include a 3D scene, which may include projected objects and a monoscopic or stereoscopic image or model of another user.

FIG. 5—Presenting a 3D Collaboration Between Computer Systems

FIG. 5 illustrates a method 500 for presenting a 3D collaboration between computer systems 100 (3D collaboration systems). The method shown in FIG. 5 may be used in conjunction with any of the computer systems or devices shown in the above figures, among other devices. In various embodiments, some of the method elements shown may be performed concurrently, in a different order than shown, or may be omitted. In some embodiments, method 500 may include additional (or fewer) steps than shown. As shown, method 500 may operate as follows.

As shown at 502, a first 3D collaboration system (e.g., local user), such as computer system 100, may receive processed captured images of a subject and a viewpoint of a user of a second 3D collaboration system (e.g., collaborator). In some embodiments, the first 3D collaboration system may also receive digital object content 180 and user control device (e.g., stylus) information (e.g., images, data from a gyroscope and/or accelerometer, etc.) from the second 3D collaboration system. Digital object content 180 may be generated by the graphic space, which may be resident in the first 3D collaboration system, the second 3D collaboration system, or in a common shared server. The graphic space may be shared between the two 3D collaboration systems. The first 3D collaboration system may be located remotely from the second 3D collaboration system. The image of the user may be in any form, such as a monoscopic or stereoscopic image. Further, in one embodiment, the image received by the first 3D collaboration system may be in the form of a raw image that must be processed in order to render a stereoscopic or monoscopic image on display 150. In other embodiments, the received images may already be processed, either fully, or to some extent. For instance, the images may be processed as described in the method of FIG. 4. In one embodiment, stylus information may include a location and a change in position/orientation of stylus 130. The first 3D collaboration system may receive information regarding other tools or physical objects, like a collaborator/user's hand or arm, in addition to or other than stylus 130.

At 504, the first 3D collaboration system may render the subject and a graphics object in the same view of a 3D scene. For instance, the 3D scene may integrate digital object content 180, virtual stylus 600, and/or an image of a physical object or the user of the different 3D collaboration system/computer system 100 within the same view. The graphics object may be received from a graphic space shared with the second 3D collaboration system. The graphic space may reside in a variety of places, as described herein.

In one embodiment, the first 3D collaboration system may receive input (e.g., from a user) to specify a perspective view. The perspective view may be the viewpoint of the user of the other system. Accordingly, the rendering of the graphics object may be based on the specified perspective view, which is described herein, and/or the viewpoint. This viewpoint may allow the user of the first system to see digital object content 180, such as one or more projected objects, as the other user may see it. Such a viewpoint may be useful in a collaborative environment where two or more users participate in a video conference. In the same shared workspace, i.e., 3D scene, users may be able to have a face-to-face conversation while one or more users describe, manipulate, or alter some digital object content 180, with the other users being able to see those manipulations from the manipulating user's viewpoint. In some embodiments, the user control device may also be rendered in the same view of the 3D scene. For example, the location and change in position and/or orientation of a stylus may be rendered in the same view. Likewise, the change in position and/or orientation of the stylus may manipulate the rendered graphic object and as a result, the rendered graphic object may be updated as a result of the manipulation. In such embodiments, the rendered stylus and rendered graphic object and/or subject may be rendered with motion in real-time. In one embodiment, when a collaborator manipulates the virtual graphic object, information regarding the manipulation (e.g., stylus position/orientation) may be sent over the network to the local user without the collaborator system sending the whole graphic object. The local user's machine may render the updated graphic object based on the information regarding the manipulation.

The perspective view may be an alternative viewpoint, such as a "tabletop" viewpoint. A tabletop viewpoint refers to a back side view as if the user and collaborator are at opposite ends of a table. In such an embodiment, the collaborative session appears as if the users are facing each other across a table with digital object content 180 between them. If the user selects the alternative viewpoint, the user may employ a gradient transparency to digital object content 180 to allow the user to see where the collaborator is looking or manipulating digital object content 180.

In one embodiment, the collaborator's stylus movements and operations may be rendered on the user's display 150 in real-time. Virtual stylus 600 may be rendered as may any modifications, alterations, or manipulations to any digital object content 180. In one embodiment, the image of the user may be a stereoscopic image. The captured image of the collaborator may be presented in the open space of display 150 along with any digital object content 180. Or the captured image of the collaborator may be presented in the closed space of display 150. When the captured image of the collaborator is presented in the closed space of display 150, in some embodiments, the presented image is positioned at a distance within the closed space representative of the distance away from cameras 160 that collaborator was positioned at the time the images were taken.

As illustrated at 506, the first 3D collaboration system may display the 3D scene by at least one display 150. For example, in one embodiment, two displays 150, as illustrated in FIG. 1, may be used to display the 3D scene. Certain portions of the 3D scene may be displayed by one of the two displays whereas other portions may be displayed by the other of the two displays. In one embodiment, the rendered, captured images may be rendered and displayed as a texture on a flat graphic. In another embodiment, the rendered, captured images may be displayed as a stereo rendering based on a head model of the graphic space.

In various embodiments, the first 3D collaboration system may receive updated captured images of the subject, an updated viewpoint of the subject, and and/or an updated position and/or orientation of a user control device (e.g., stylus). Based on the updated images and viewpoint, the 3D collaboration system may update the 3D scene. The updating may be in real-time or near real-time. In various embodiments, blocks 502-506 may be repeated to allow for such updating.

FIGS. 6-9—Exemplary Illustrations of 3D Collaboration

FIGS. 6-9 illustrate various illustrations of embodiments according to the current disclosure. Note that while FIGS. 6-9 do not show a stereo representation of the other user on a given user's display, the representation of the other user may be a stereo representation.

Figure 6:
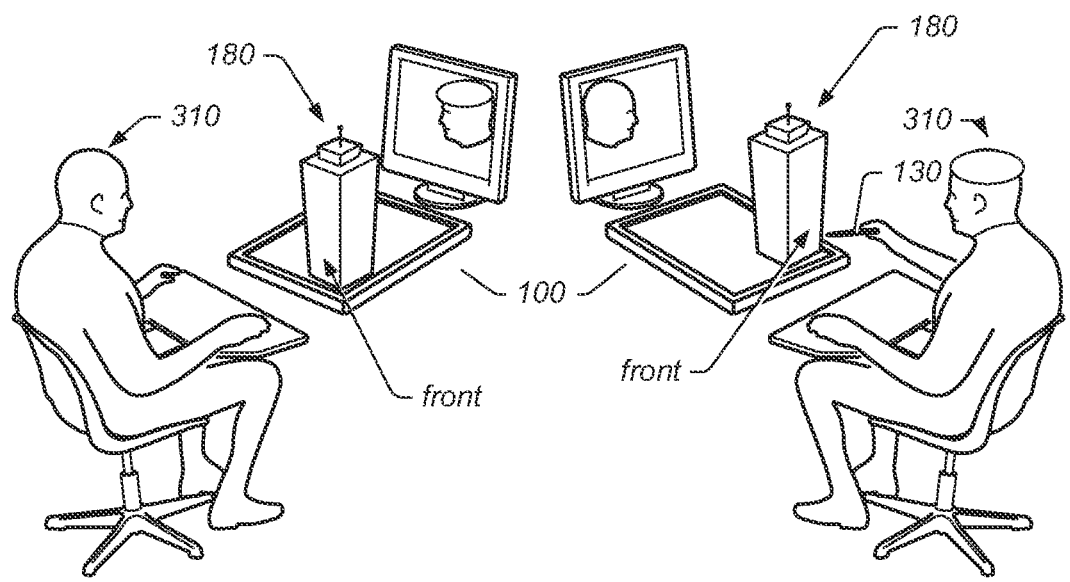
FIGS. 6-9 are exemplary illustrations of the described embodiments.

FIG. 6 illustrates a collaborative environment between two computer systems 100. In the illustrated example, either user may be a collaborator. For ease of explanation of the viewpoint, let the user on the right be the collaborator and the user on the left be a local user. The selected viewpoint in this example is that of the collaborator. As seen in FIG. 6, the view of the building, or digital object content 180, is oriented and positioned in the local user's display 150 as it is in the collaborator's display 150. In this example, the collaborator and local user each see a rendering of the other user in the same view as digital object content 180. This allows each user to see the other user and at the same time see the common digital object content 180, in this case a building. In some embodiments, the collaborator and local user may be positioned at different perspectives to their respective displays (e.g., local user may be standing up while the collaborator may be sitting to one side of display 150). Local user's display 150 may render digital object content 180 in the perspective of the collaborator. Local user's display 150 may render processed captured images or scene graphics from the collaborators current perspective from collaborator's 310 system 100. The images or scene graphics projection may have its projection determined by the processing system with information captured by one or more tracking sensors associated with the collaborator's system. Sensors may include one or more cameras 160. Rendered images and/or digital objects may include a monoscopic or stereoscopic image or model. The images may be from cameras associated with the tracking system or may be from cameras independent of the tracking system.

The rendering on local user's display 150 may further depend on local user's perspective. For example, the local user may be positioned off centered from the local user's display(s). Accordingly, in one embodiment, the rendering may be different for the local user who is off center relative to the local user's display versus the local user who is directly centered relative to the local user's display. In either scenario, the system may adapt the rendering so that the local user's perspective matches the collaborator's viewpoint.

Figure 7:
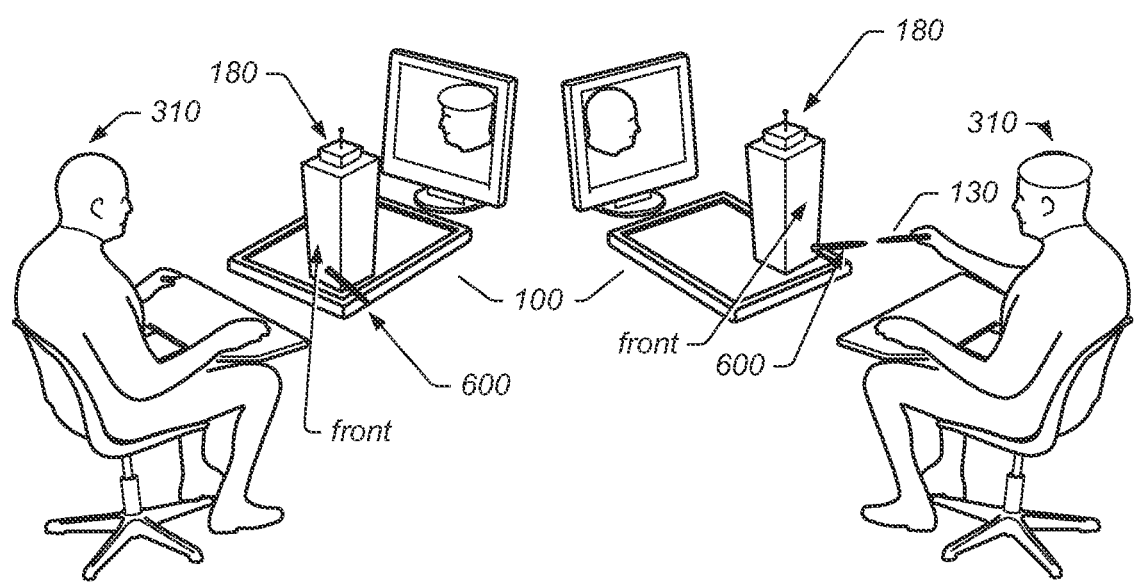

FIG. 7 illustrates another collaboration environment between two computer systems 100. As in FIG. 6, the selected viewpoint is that of the collaborator. Shown in FIG. 7 is the collaborator's manipulation of the shared digital object content 180. Here, not only may the collaborator see an extension of his stylus 130, or virtual stylus 600, on the collaborator's display 150 but the local user may also simultaneously see the same virtual stylus 600 on the local user's display 150. The rendition of virtual stylus 600 may appear in real-time on both computer systems 100.

Figure 8A:
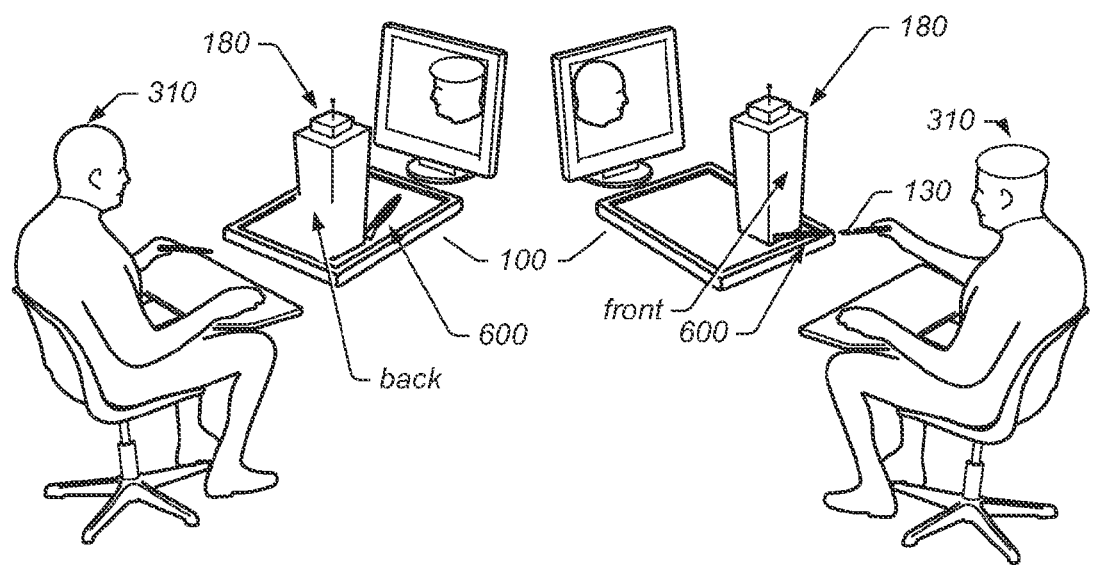

FIG. 8A illustrates yet another collaboration environment between two computer systems 100. As in FIG. 7, the local user may see a rendition of virtual stylus 600 on the local user's display 150. Different from FIG. 7, and shown in FIG. 8A, is an alternative viewpoint. FIG. 8A illustrates the alternative "tabletop" viewpoint where the two users are looking at each other (with stereo views of each other) and the shared digital object content 180 as if they were facing each other at opposite sides of a table with the shared digital object content 180 atop the table between them. In other words, digital object content 180 may be presented with a backside of the digital object content outward from the display (e.g., toward the local user positioned in front of the display). Also shown is the gradient transparency that the local user may select for local user's display 150. As shown, the building is more transparent the closer its location to the local user. Conversely, the building is rendered more opaque the farther its location from the local user. By employing a gradient transparency to digital object content 180, the local user may be able to see a collaborator through digital object content 180 to see where the collaborator is looking or how the collaborator is using his stylus 130, or to see where the collaborator's virtual stylus is positioned with respect to digital object content 180. The virtual stylus may be rendered on the local user's display.

In some embodiments, the local user may display the scene from the local user's locally tracked viewpoint while not manipulating the graphic virtual object. In such embodiments, the local user's viewpoint may be tracked by cameras of his own 3D collaboration system and display/update the scene accordingly based on the viewpoint. The tabletop viewpoint is one such example of displaying the scene from the local user's local tracked viewpoint.

Figure 8B:
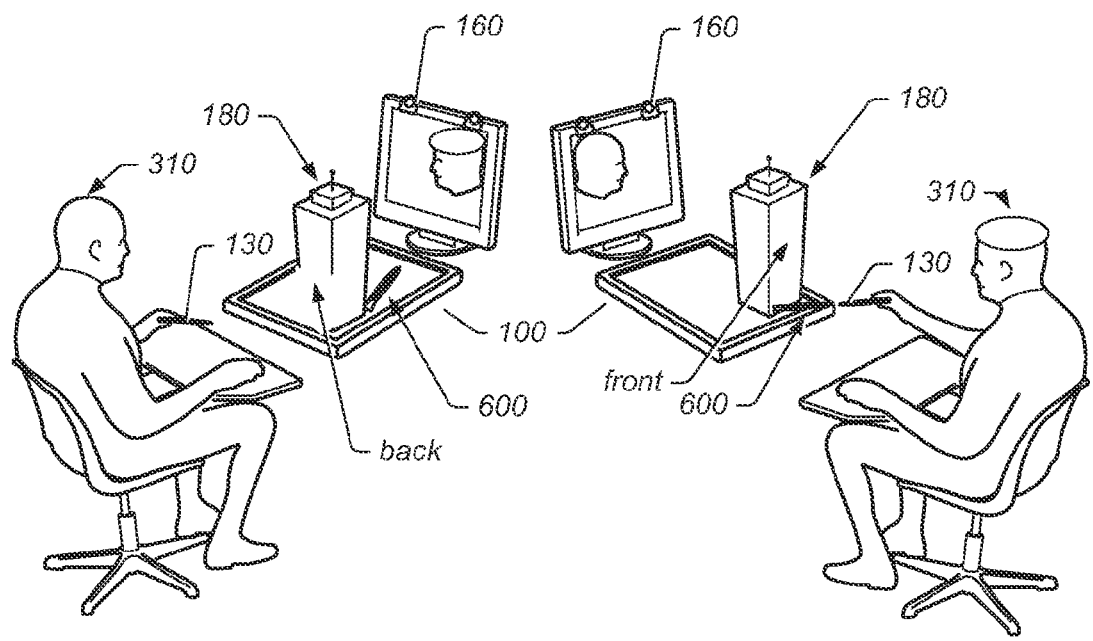

In some embodiments, the collaborator and local user may be positioned at different perspectives to their respective displays. The local user may initiate viewing the local user display at a first perspective of the rendered object as seen by the collaborator, but then change position to a second position/orientation, therefore a second perspective, which causes the processing unit to re-render the projection of the collaborators view as seen by the local user to a second projection based on the changed perspective of the local user. Local user's display 150 may render digital object content 180 in the perspective of the collaborator. FIG. 8B illustrates another collaboration environment between two computer systems 100. In FIG. 8B the local user is depicted viewing the digital object from a different perspective to their display device than the collaborator's perspective to the collaborator's display device, so where the collaborator has a perspective view of the graphic scene as projected and rendered on the collaborator's device the local user starts with the rendering as projected based on the collaborator's perspective of the graphic scene. The local user may render a second projection using the collaborator's perspective as the base, but change the local user's rendering based on the perspective of the local user. Therefore the local user sees the rendering of the collaborator's view but from the changed perspective of the local user.

In some embodiments, the local user may determine from what perspective the digital object is viewed for the rendering for the local user only. The local user may determine the perspective from which the digital object (whose original perspective is determined by the collaborator) is viewed in any number of ways discussed herein. For example, the local user may employ a local stylus (not depicted) to adjust his perspective of the digital object. In some embodiments, the local system may employ one or more first tracking sensors (e.g., two tracking sensors). The tracking sensors may function to track a viewpoint of the local user. The tracking sensor may track the local user's head position/orientation and from there a processing subsystem may extrapolate a perspective of the digital object as selected and viewed by the collaborator then rendered on the local user's display in a manner which correlates to the viewpoint of the local user. Tracking sensors may include digital cameras (e.g., digital cameras 160 as depicted in FIG. 1). The processing subsystem may function to adjust a perspective of the projected rendering of a first graphics object such that the perspective matches the viewpoint of the local user. Rendered images and/or digital objects may appear as a monoscopic or stereoscopic image or model.

Figure 8C:
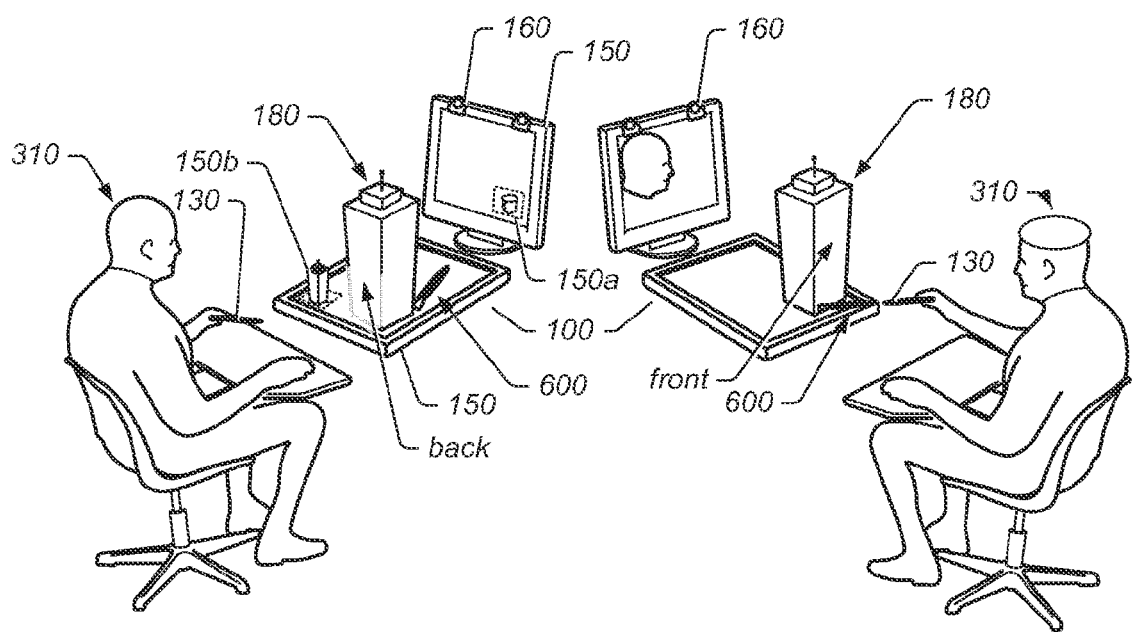

In some embodiments, renderings of captured images or one or more graphic objects within a scene are substantially confined to a portion of local user's display. FIG. 8C illustrates another collaboration environment between two computer systems 100. In FIG. 8C rendered images are depicted as confined to portion 150*a* of display 150. In general confining rendered images to a portion of the display may be termed as creating a Picture-In-Picture (PIP). In FIG. 8C a graphics object is depicted as confined to portion 150*b* of display 150. In FIG. 8C the graphics object depicted in portion 150*b* may be confined to portion 150*b* of display 150. There are advantages to depicting different renderings in PIP portions of a display. For example, in FIG. 8C the main rendering of the collaborator's graphic object depicted in display 150 is depicted with the back of the graphic object directed towards the local user (an opposing perspective to that which the collaborator is viewing the graphic object). However, the graphic object is also depicted in portion 150*b* of display 150 wherein the collaborator's graphic object is depicted with the front of the graphic object is directed towards the local user (projected from the perspective of the collaborator in how the collaborator is viewing the digital object). Rendered images and/or digital objects may appear as a monoscopic or stereoscopic image or model.

Figure 8D:
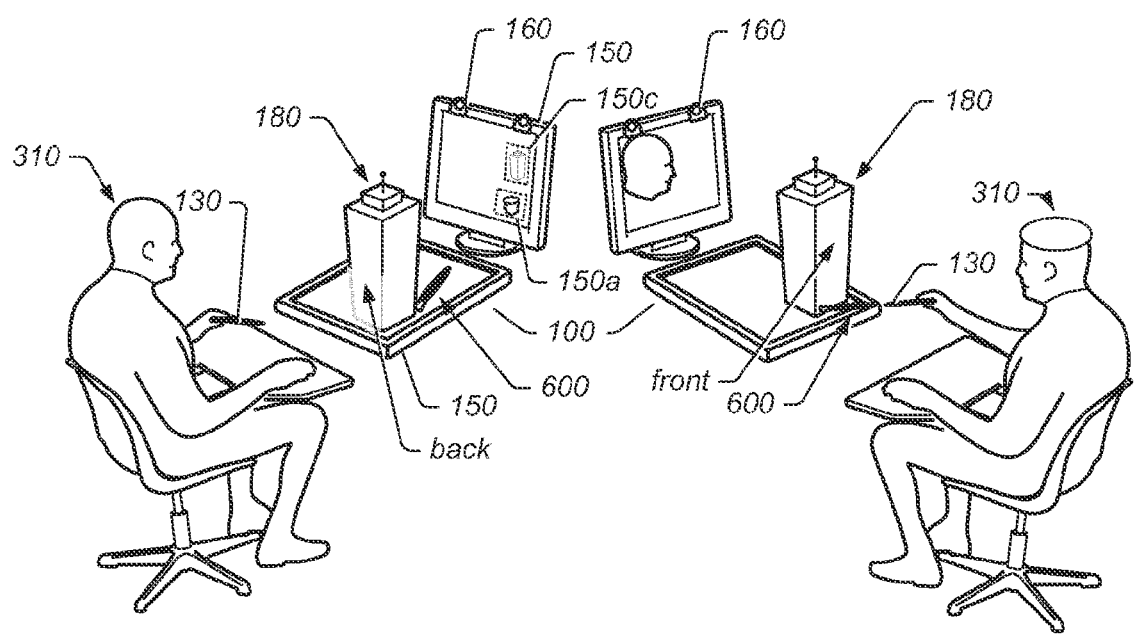

In some embodiments, renderings of collaborator's captured camera images are substantially confined to a first portion of the local user display, while renderings of a graphics objects as seen/positioned by the collaborator is substantially confined to a second portion of the local user's display. FIG. 8D illustrates another collaboration environment between two computer systems 100. In FIG. 8D rendered images are depicted as confined to portion 150*a* of display 150, while renderings of a graphics object are depicted as confined to portion 150*c* of display 150.

Figure 8E:
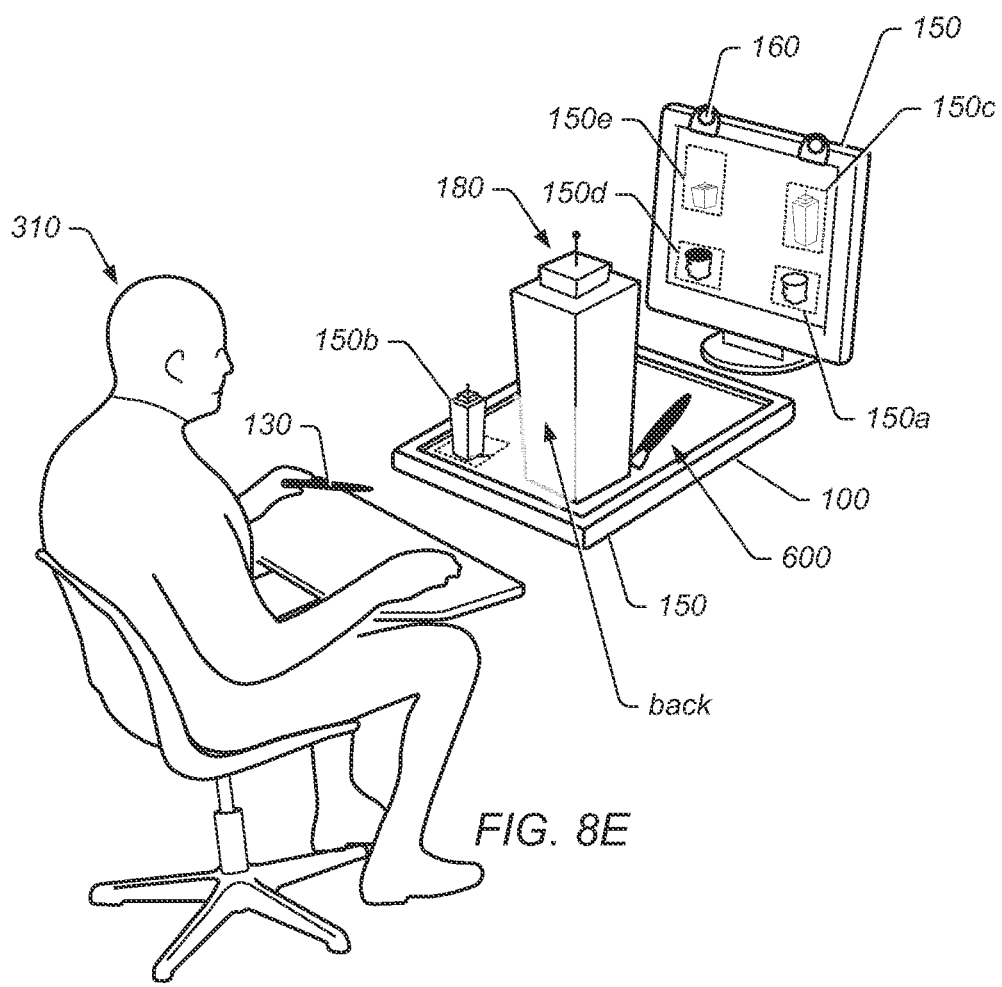

In some embodiments, a processing subsystem receives processed graphics or captured images of at least a third subject and/or a viewpoint of a third user from at least a third 3D collaboration system. The processing subsystem may render the processed captured images of the at least third subject and/or a third graphics object in at least a portion of the local user display. FIG. 8E illustrates a portion of a collaboration environment between two computer systems 100. In FIG. 8E rendered images from a first collaborator are depicted as confined to portion 150*a* of local user display 150, while renderings of a graphics object from the first collaborator are depicted as confined to portion 150*c* of local user display 150. In FIG. 8E rendered images from the perspective seen by a second collaborator are depicted as confined to portion 150*d* of local display 150, while renderings from the perspective seen of a graphics object from the second collaborator are depicted as confined to portion 150*e* of local user display 150. In FIG. 8E first and second collaborators are not depicted except in local user's display 150. Embodiments are not limited by the number of collaborators which may work together and share their work using the systems described herein. Again in this case, the local user may affect the projection by changing the local user's perspective to their screen as tracked by the local screen's tracking system, which in turn will augment the projections rendered in each of local users in portions 150*a*, 150*c*, 150*d* and 150*e* or if the local user chooses the local user's perspective may be rendered in additional portions of the display keeping the collaborator's perspective in the original portions for reference.

Figure 13:
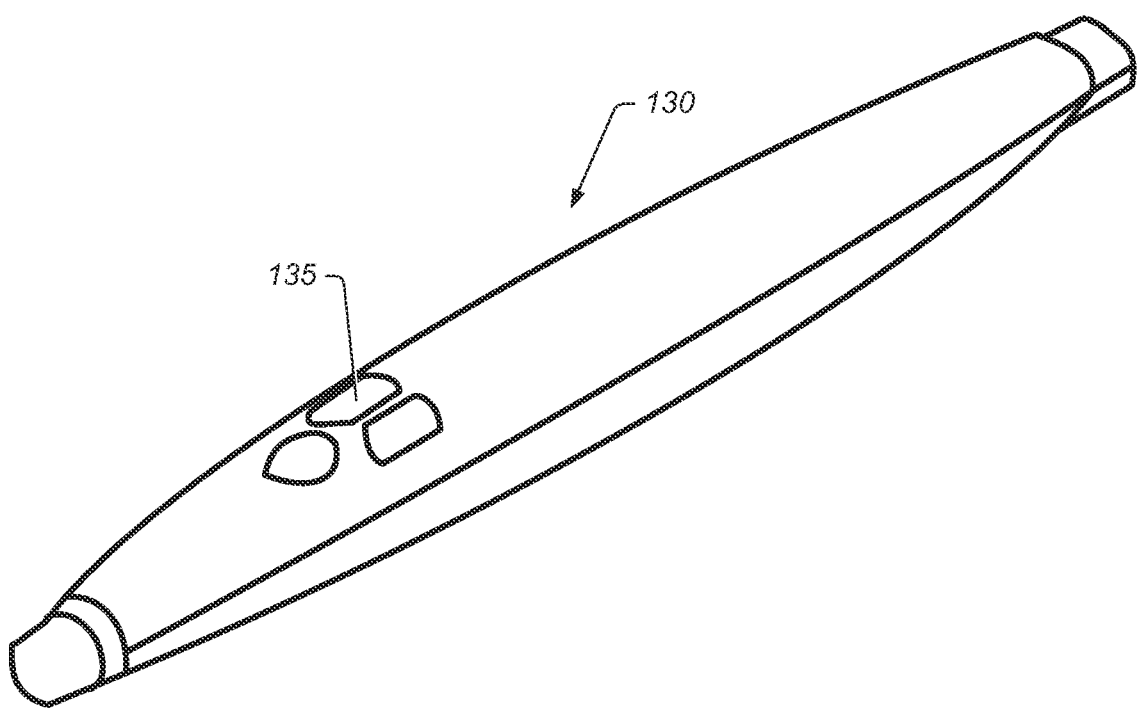
FIG. 13 is an exemplary illustration of one embodiment of a handheld device with a control system.

In some embodiments, rendering of the collaborator's graphics object as rendered on the local user's display is selected by the local user using a physical device in combination with their perspective being tracked using a head or eye tracking system. A physical device may include a hand, finger or a handheld device. An example of a handheld device may include a stylus. FIG. 13 is an exemplary illustration of one embodiment of handheld device (e.g., stylus 130) with control system 135. A user may interact with graphics object via the stylus 130. The physical stylus 130 may be extended in the 3D scene via the projected, virtual stylus 600 (e.g., as depicted in FIG. 8). To specify a viewpoint, the local user may use stylus 130 for manipulating the viewpoint (e.g., for selection and movement). The hand held device may include any tracked device. Stylus 130 may include a variety of shapes and may contain one or more functional attributes as in one or more button.

In another implementation, the collaborator may use a handheld device as in a stylus (or finger or hand) to control a virtual camera. The virtual camera may be tracked by a tracking device to capture a scene in line with the handheld device or may in the scene space be represented by a camera capture object that may be positioned by means of the handheld device to capture a scene within the graphic space. The virtual camera .has its own perspective of viewing the collaborator's displayed scene. The scene as captured by the collaborator's virtual camera may be rendered on the local user's display. The rendering may be the within the entire display or may be rendered within a region of the entire display. The rendering within the local user's display may be from the perspective of the collaborator's virtual camera capture or the rendering on the local user's display (or within the region of the local user's display) may be of a projection consummate with the current perspective of the local user as the local user views the local user display or the local user views the region within the local user display where the collaborator's virtual camera scene is displayed. The rerendering of the projection on the local user device may be performed by a processing unit that is performing the projection capture on the local user's processing system, which has a matched graphic model as on the collaborator's processing system or the rerendering of the projection on the local user device may be performed by a processing unit that is performing the projection capture on the collaborator's processing system, which is then conveyed to the local user's processing device for rending onto the local user's display The local user's rendering on the local user's display conveying the captured scene from the collaborator's virtual camera may be rendering in mono or stereo 3D.

The local user may in turn be using a virtual camera to augment the view as seen by either the local user of the collaborator's view or the collaborator's virtual camera view. The local user's virtual camera may be positioned within the virtual scene as rendered on the local user's using a handheld device or hand or finger. The handheld device is tracked by the local user's tracking system and what is captured is based on the positioning of the local user's handheld device in X, Y or Z in position and pitch, yaw and roll in orientation, plus the head (or eye) tracked position in X, Y or Z and well as the pitch, yaw and/or roll of the local user's perspective. With the local user positioning the local user's virtual camera within the display's view or the region of display's view within the local user's display of the scene rendered from one o more collaborators or collaborator virtual camera, the local user may view a scene based on the collaborator's view. This new scene may rendered be within the local user's display or on one of more collaborators display. In one embodiment, the rendering from the local user's virtual camera may be a mono scene view or a stereo 3D scene view.

The projections of the rendered graphics scene from the collaborator as determined by the perspective of the local user may change as the change in the perspective of the local user is tracked by the local user's tracking system.

The handheld physical device may include control system 135 which when activated by the collaborator captures a viewpoint. The control system may include a plurality of controls. The control system, as depicted in FIG. 13, may include 3 buttons. When the control system is activated by a user a viewpoint may be captured. The viewpoint selected may be oriented along a longitudinal axis of stylus 130 or it may be a 3 degree of freedom positional or 3 degree of freedom orientational offset from one end of the stylus. Upon activation of the control system the viewpoint captured using the stylus may be static like snapping a photograph using the stylus, that is, an instance of the view at the viewpoint at the time of activation may be stored in local memory. Upon activation of the control system the viewpoint selected using the stylus may be dynamic such that as the stylus is moved the viewpoint changes. Different functions such as these may be assigned to different buttons on stylus 130. In one example, the activation of the button may initiate a continuous capture of the stylus viewpoint as in a video capture, that may store the continuous capture on a memory device. A second activation of the button may end the capture process. The activation may be from activating the control on the handheld device or some other control, such as a key on a keyboard. Essentially a virtual camera has been bound to the end of the stylus. So, for example, whatever you point at will get rendered to a 2D picture a display, allowing you to inspect 3D models and designs in greater detail. The controls may have additional functionalities depending upon the number of controls and/or how the controls are interacted with (e.g., whether a button is single or double tapped). Pressing one of the stylus's buttons could potentially trigger the capture of a snapshot and send it off to a shared photo roll for all connected users to browse and review.

The different collaboration embodiments described herein may be used together in different combinations. For example, in some embodiments, stylus 130 may be used by one or more collaborators to capture a viewpoint ("stylus viewpoint"). The collaborator's stylus viewpoints may appear in one or more PIPs in a local user's display. The local user may then adjust the viewpoint displayed in the PIPs in his local display using at least any of the viewpoint adjustment methods described herein.

Figure 9:
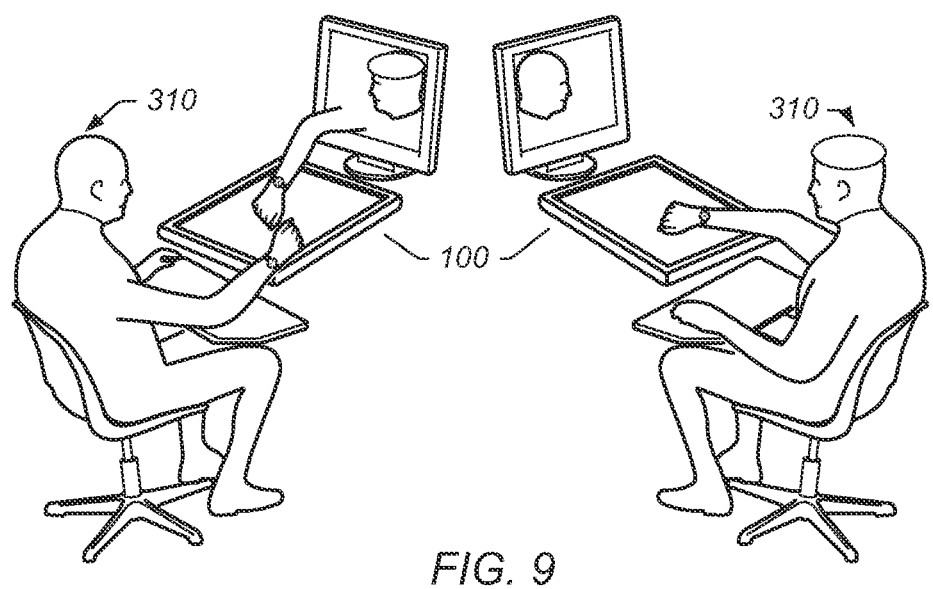

FIG. 9 illustrates another collaboration environment between two computer systems 100. In the illustrated embodiment, the local user's display 150 renders a stereoscopic image of the collaborator's arm and watch in the open space of display 150, however, the collaborator's display 150 does not render a stereoscopic image of the local user's arm. In other embodiments, each user's display 150 may render a stereoscopic image of the other user. In one embodiment, captured stereo video of the collaborator may be displayed on a user's display 150 in combination with stereo rendered graphics (digital object content 180) in a manner that allows the collaborator to interact with the volume space of the user. In this embodiment, instead of using a head graphic for collaboration, a flat graphic object, which may be an outline of a head, may be used with the captured video being used as texture. The flat head graphic with distinct left eye and right eye projections for stereo rendering may be coincident with a conveyed screen offset that coincides with a zero parallax offset setting of the captured video. In other words, if the collaborator's head is at a position two feet behind the collaborator's display 150 and detected as such, then the rendition of the collaborator on the local user's display 150 may be facilitated by driving the flat head graphic with the corresponding video texture to be rendered at a position corresponding to two feet behind the conveyed screen edge of the local user's display 150 as seen on a stereo display. To facilitate this embodiment, cameras 160 may be set to have zero parallax at the client side edge of the screen during image capture. As shown in FIGS. 10-12, the cameras 160 views may then be cropped to correlate with the expected dimension of the viewing device. Further, a lens system may correct distortions introduced by conveying captured video to another display 150 having a one-to-one correspondence. In some embodiments, the system may use a magnification that does not contribute to introducing a zoom (+/−) factor to the captured image. On the local user's side, the local user's computer system 100 may integrate the captured head video as texture for a corresponding flat head graphic. Because the video has its defined parallax coincide with the user's display, the graphics engine may create a flat head graphic object that is established within the graphic space coinciding with the vertical to be placed at the user's back part of the screen. In this way, the precise positioning of the collaborator's captured head video may allow the local user's rendition to have a one-to-one correspondence with the video motion. That is, as the collaborator's head moves, its position in space may be tracked and the corresponding flat head graphic may be so correlated in the graphic space to have its positional distance from the user's screen edge match that at the collaborator's screen edge, so the view, as may be seen by the user, to the collaborator's head may reflect the actual position of the collaborator's head from the collaborator's display. Additional cameras 160 may be used, which may optimize where the imagery is best captured for rendering on the local user's display 150.

In various embodiments, system 100 may choose where the zero parallax is to be and may match the zero parallax of the captured video volume with the zero plane of the render volume. The zero parallax may be further determined through image processing. Illustrated in FIG. 9, the collaborator is wearing a watch and placing it over display 150B beyond the zero parallax of cameras 160. Cameras 160 may capture images of the collaborator and watch and convey them to the local user's graphic space. The local user may see the images as a rendering on his stereo display 150 adjacent to local user's watch. In another example, two users of systems 100 may play virtual chess. The chess pieces may be graphic models (digital object content 180) while the two players may see each other's hands come into view with the chess pieces.

FIGS. 10-12—Exemplary Illustrations of Cropping Camera Views

FIGS. 10-12 illustrate various illustrations of embodiments of cropping the left and right camera views according to the current disclosure.

FIGS. 10-12 illustrate two cameras 160 with a separation between the two captured images. In one embodiment, cameras 160 include a left and a right camera 160. Zero parallax point 1000 may coincide with the location of display 150, in a linear location from the user to the display. In each of the illustrated embodiments, the left and right camera 160 views have been cropped to correlate with the expected dimension of display 150. As shown in FIGS. 10-12, cameras 160 may have their angle of view, in addition to their overlapping regions, be cropped to support zero parallax point 1000. The left most depicted camera in each of FIGS. 10-12 has an angle of view defined by C and D. The right most depicted camera has an angle of view defined by A and B. In one embodiment, shown in FIG. 10, where user 310, or any other object, is behind zero parallax point 1000, the user's rendition may be projected behind display 150, such that the cameras are adjusted so that the A and C angle of view lines, and the B and D angle of view lines both intersect at a plane between the camera and the user 310. As shown in FIG. 11, where user 310 is in line with zero parallax point 1000, the user's rendition may be projected at the display 150 location, such that the cameras are adjusted so that the A and C angle of view lines, and the B and D angle of view lines both intersect at a plane in line with the user 310. Finally, as shown in FIG. 12, where user 310 is between zero parallax point 1000 and the cameras 160, the user's rendition may be projected in front of display 150, such that the cameras are adjusted so that the A and C angle of view lines, and the B and D angle of view lines both intersect at a plane beyond the user 310, i.e., in the open space of display 150.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A system, comprising:
a first three-dimensional (3D) collaboration system comprising:
a first display configured to project a stereo 3D scene; and
a first processing subsystem configured to:
receive processed captured images of a first subject and a viewpoint of a second user of a first graphics object from a second 3D collaboration system;
render the processed captured images of the first subject and the first graphics object in the stereo 3D scene; and
capture a 3D scene from a viewpoint of a virtual camera, wherein the viewpoint of the virtual camera is based on a position of a user input device associated with the first 3D collaboration system;
one or more first tracking sensors configured to track a six degree of freedom viewpoint of a first user associated with the first 3D collaboration system, wherein the first processing subsystem is configured to adjust a projection of the rendered processed captured images of the first subject and the first graphics object such that the projection substantially matches a viewpoint of the first user; and
wherein the first processing subsystem is further configured to provide the viewpoint of the first user, the captured 3D scene, and a captured image of the first user to the second 3D collaboration system, wherein the second 3D collaboration system is configured to:
display the captured image of the first user and the first graphics object from the viewpoint of the first user substantially concurrent to the first 3D collaboration system displaying the first graphics object from the viewpoint of the first user in a first portion of a display; and
display the captured 3D scene in a second portion of the display.

2. The system of claim 1,
wherein said rendering of the processed captured images of the first subject or a first graphics object are substantially confined to a portion of the first display.

3. The system of claim 1,
wherein said rendering of the processed captured images of the first subject are substantially confined to a first portion of the first display, and wherein said rendering of a first graphics object is substantially confined to a second portion of the first display.

4. The system of claim 1,
wherein the first processing subsystem configured to:
receive processed captured images of a third subject and/or a viewpoint of a third user from at least a third 3D collaboration system, and
render the processed captured images of the third subject and/or a third graphics object in at least a first portion of the first display.

5. The system of claim 1,
wherein the first processing subsystem is configured to adjust a change in projection of the rendered processed captured images of the first subject and a first graphics object such that the changed projection substantially matches the tracked changed viewpoint of the first user.

6. The system of claim 1,
wherein the first processing subsystem is configured to render the stereo 3D scene as monoscopic and/or stereoscopic images.

7. The system of claim 1,
wherein the viewpoint of the second user from the second 3D collaboration system is selected by the second user using a handheld device or hand.

8. The system of claim 7,
wherein the handheld device or hand comprises a control system which when activated by the second user selects the viewpoint, wherein the viewpoint defines a localized scene within the stereo 3D scene which becomes stored for later retrieval.

9. The system of claim 1,
wherein said rendering the processed captured images includes rendering the processed captured images as a texture on a flat graphic.

10. The system of claim 1,
wherein said rendering of the graphics object is according to a tabletop view.

11. The system of claim 10,
wherein to project the 3D scene, the first display is configured to project the rendered processed captured images by projecting the flat graphic coincident with a conveyed screen edge of the first display that coincides with a zero parallax setting from which the captured images were captured.

12. The system of claim 1,
wherein the first graphics object is one of a plurality first graphics objects that are within a graphic space, wherein the graphic space is a computer model of objects and where the rendering is the rendering of a subset of the graphic objects within a proximity to each other as seen from the perspective captured by the second 3D collaboration system.

13. A method for three-dimensional (3D) collaboration between a first stereo 3D collaboration system and at least a second stereo 3D collaboration system, comprising:
receiving captured images of a first subject and a viewpoint of a second user from the second stereo 3D collaboration system using the first stereo 3D collaboration system;
rendering the captured images and a first graphics object in a stereo 3D scene using the first stereo 3D collaboration system;
projecting the stereo 3D scene using a first display of the first 3D collaboration system;
capturing a 3D scene from a viewpoint of a virtual camera, wherein the viewpoint of the virtual camera is based on a position of a user input device associated with the first 3D collaboration system; and
tracking a six degree of freedom viewpoint of a first user associated with the first 3D collaboration system using one or more first tracking sensors;
adjusting a projection of the rendered processed captured images of the first subject and the first graphics object such that the projection matches the viewpoint of the first user using the first processing subsystem; and
providing the viewpoint of the first user, the captured 3D scene, and a captured image of the first user to the second 3D collaboration system, wherein the second 3D collaboration system is configured to:
display the captured image of the first user and the first graphics object from the viewpoint of the first user substantially concurrent to the first 3D collaboration system displaying the first graphics object from the viewpoint of the first user in a first portion of a display; and
display the captured 3D scene in a second portion of the display.

14. The method of claim 13, further comprising:
confining said rendering of the processed captured images of the first subject or a first graphics object to a portion of the first display.

15. The method of claim 13, further comprising:
confining said rendering of the processed captured images of the first subject to a first portion of the first display; and
confining said rendering of a first graphics object to a second portion of the first display.

16. The method of claim 13, further comprising wherein:
receiving processed captured images of a third subject and/or a viewpoint of a third user from at least a third 3D collaboration system using the first processing subsystem configured, and
rendering the processed captured images of the third subject and/or a third graphics object in at least a first portion of the first display using the first processing subsystem configured.

17. The method of claim 13, further comprising:
rendering the stereo 3D scene as monoscopic and/or stereoscopic images using the first processing subsystem.

18. The method of claim 13,
wherein the viewpoint of the second user from the second 3D collaboration system is selected by the second user using a handheld device or hand.

19. The method of claim 13,
wherein the handheld device or hand comprises a control system which when activated by the second user selects the viewpoint, wherein the viewpoint defines a localized scene within the stereo 3D scene which becomes stored for later retrieval.

20. A system, comprising:
a first three-dimensional (3D) collaboration system comprising:
a first display configured to project a stereo 3D scene; and
one or more first tracking sensors configured to track a six degree of freedom viewpoint of a first user associated with the first 3D collaboration system; and
a first processing subsystem configured to:
receive processed captured images of a second user, a captured 3D scene, and a viewpoint of the second user of a first graphics object form a second 3D collaboration system, wherein the captured 3D scene is from a viewpoint of a virtual camera of the second 3D collaboration system, wherein the viewpoint of the virtual camera is based on a position of a user input device associated with the second 3D collaboration system;
render the processed captured images of the second user and the first graphics object in the stereo 3D scene according to the viewpoint of the second user in the first portion of the display; and
render the captured 3D scene according to the viewpoint of the virtual camera in a second portion of the display.

* * * * *